(12) United States Patent
Cauchy et al.

(10) Patent No.: US 8,291,866 B2
(45) Date of Patent: Oct. 23, 2012

(54) HEATING AND COOLING SYSTEM FOR PET ENCLOSURES

(75) Inventors: Matt Cauchy, Traverse City, MI (US); Cecil McKinney, Kissimmee, FL (US)

(73) Assignee: Covenant Partners, Inc., Revere, MA (US)

( * ) Notice: Subject to any disclaimer, the term of this patent is extended or adjusted under 35 U.S.C. 154(b) by 295 days.

(21) Appl. No.: 12/870,758

(22) Filed: Aug. 27, 2010

(65) Prior Publication Data
US 2010/0319627 A1 Dec. 23, 2010

(51) Int. Cl.
*A01K 1/03* (2006.01)
(52) U.S. Cl. ............... 119/500; 119/482; 119/487
(58) Field of Classification Search ............... 119/500, 119/448, 452, 484, 493
See application file for complete search history.

(56) References Cited

U.S. PATENT DOCUMENTS

| | | | |
|---|---|---|---|
| 3,962,993 A * | 6/1976 | Dattilo | 119/500 |
| 4,827,872 A | 5/1989 | Sommers | |
| 4,878,359 A | 11/1989 | Mandell | |
| 4,939,911 A | 7/1990 | Mandell | |
| 5,216,977 A | 6/1993 | Allen, Jr. | |
| 5,727,503 A | 3/1998 | Whittaker | |
| 5,746,271 A * | 5/1998 | DeCosta | 165/53 |
| 5,799,614 A * | 9/1998 | Greenwood | 119/452 |
| 5,887,436 A | 3/1999 | Duddleston | |
| 5,975,025 A * | 11/1999 | Kangas et al. | 119/484 |
| 6,237,531 B1 | 5/2001 | Peeples et al. | |
| 6,403,922 B1 * | 6/2002 | Hawks et al. | 219/385 |
| 6,446,577 B1 | 9/2002 | Salahor | |
| 6,490,995 B2 * | 12/2002 | Greene, Jr. | 119/496 |
| 6,637,374 B2 * | 10/2003 | Hawks et al. | 119/448 |
| 6,647,925 B1 | 11/2003 | Waiters | |
| 6,668,819 B1 * | 12/2003 | Remsburg | 126/633 |
| 6,725,805 B1 | 4/2004 | Bach | |
| 6,923,144 B2 | 8/2005 | Little | |
| 2002/0184895 A1 | 12/2002 | Anderson | |
| 2003/0127060 A1 | 7/2003 | Yeung | |

FOREIGN PATENT DOCUMENTS
JP 2002345358 11/2006
WO 92/05691 4/1992

OTHER PUBLICATIONS

Patent Cooperation Treaty; International Preliminary Report on Patentability for International Application No. PCT/US2006/010960.
Patent Cooperation Treaty; International Search Report for International Application No. PCT/US2006/010960.

* cited by examiner

*Primary Examiner* — Yvonne Abbott
(74) *Attorney, Agent, or Firm* — Marc E. Hankin; Kevin Schraven; Hankin Patent Law, APC

(57) ABSTRACT

The invention is a heating and cooling system for portable pet living space and is able to efficiently heat and cool the pet because it heats and cools both the air surrounding the pet and the surfaces upon which the pet lays.

13 Claims, 20 Drawing Sheets

HEATING AND COOLING SYSTEM FOR PET ENCLOSURES

RELATED APPLICATIONS

This application is a Continuation-in-Part and relies for priority in part on U.S. Provisional Application No. 60/684,328, filed May 25, 2005, entitled "Temperature Controlled Pet Carrier," which is expressly incorporated herein by reference. This application also claims priority to Patent Cooperation Treaty Application No. PCT/US2006/010960, filed Mar. 22, 2006, entitled "Temperature Controlled Pet Kennel," which is expressly incorporated herein by reference. This application also claims priority to U.S. National Stage Patent Application Ser. No. 11/569,431, filed Nov. 20, 2006, entitled "Heating And Cooling System For Pet Enclosures," which is expressly incorporated herein by reference.

FIELD OF INVENTION

Various embodiments of this invention relate, generally, to pet kennels and pet carriers; more particularly, to systems that regulate the temperature within pet kennels and pet carriers.

BACKGROUND

As pets are a ubiquitous part of life, pet carriers have been developed in order to allow the easy transport of pets along with their owners. While relatively simple devices are sufficient in order to cage or carry pets, because animals are sensitive to extreme temperatures, simple pet carriers are inadequate in conditions where the pets may encounter extreme temperatures. If, for example, a pet is kept in a car with closed windows on a sunny day, the pet may experience extreme temperatures that could harm the pet. Likewise, if a pet is left within a car or outdoors on a very cold day, the pet could be harmed by the cold weather. Thus, several pet kennels and pet carriers have been developed that seek to regulate the temperature encountered by the pet while within the carrier.

U.S. Pat. No. 6,237,531 to Peeples et al., for example, discloses a pet bed with heating and cooling capabilities. Peeples' device operates using a thermoelectric unit, which is mounted to the underside of the device with appropriate ducting for air circulation such that, depending on the electrical connection, heating or cooling is provided to a sink that is integral to the pet bed platform. In this manner, Peeples discloses a system for regulating the temperature of a bed upon which a pet lies in an open air environment that is elevated to provide a heated or cooled air layer below the pet bed, surrounded by a ring.

Peeples, however, fails to disclose a system that is sufficiently compact to be integrated into a portable pet carrier. For example, Peeples discloses a pet bed that includes a thermoelectric unit that is mounted to the bottom of the pet bed. This is a very bulky design and Peeples provides no alternate embodiments of the thermoelectric unit and utterly no disclosure as to how this thermoelectric unit would be integrated with a Convection unit.

Additionally, Peeples discloses a pet bed that that can only achieve temperatures that are 20-30° F. lower than the ambient temperature surrounding the pet. The thermoelectric conduction system of the Peeples pet bed may be controlled automatically or manually. The automatic system is controlled by a thermostat that merely switches the thermoelectric unit between heating and cooling, which is exactly what a user may do manually. Importantly, Peeples does not disclose a thermostat that adjusts the thermoelectric unit based on the overall temperature experienced by the pet for better temperature control.

Furthermore, the Peeples device only addresses the temperature experienced at the surface of the bed, and utterly fails to regulate the ambient temperature surrounding the bed. Indeed, before the present invention, as disclosed and claimed within this Application, no such device had been invented or was commercially available.

Other devices that disclose means for protecting pets from extreme temperatures are disclosed by U.S. Pat. No. 6,446,577 to Salahor, and U.S. Patent Application Publication No. 2003/0127060 to Yeung. Salahor's patent discloses a pet carrier featuring an insulated cloth cover. Yeung's patent discloses a pet carrier that features a compartment for inserting an air conditioning pad. However, the Yeung device ventilates air within the portable pet carrier by using porous material or sections of the pet carrier that contains holes, such as a mesh fabric or a flexible curtain, and, importantly, not forced ventilation. In fact, Yeung discloses only a compartment located in an enclosure to hold a means to filter the air through a heating pad, cooling pad, odor remover, or air freshener, and it does not disclose an air conditioning unit that is integrated in the device. Although the Yeung device discloses various passive means for minimizing the impact of extreme temperatures on a pet, through insulation the pet, the Yeung device is insufficient and ineffective in protecting the pet from more drastic weather disparities because an active heating and cooling system is not employed.

Moreover, merely combining a heating and cooling pet bed invention, such as the Peeples device, with a portable pet living space, such as the Salahor device or the Yeung device, is not disclosed or made obvious by these references. Furthermore, there is no motivation within these references to actually combine their teachings. The significant differences in the circuitry between Yeung, Salahor, and Peeples would make the resulting product very awkward if the teachings of these references were to be combined.

Further means for cooling pets while they are kept within kennels and carriers are disclosed by U.S. Pat. Nos. 5,727,503 and 6,490,995 to Whittaker and Greene, Jr., respectively. Both Whittaker's and Greene's devices use ice as a means to supply chilled air to the animal's enclosed space. These devices suffer from certain shortcomings, because, as the ice is heated and melts, it is no longer effective in providing cooling. Also, ice is heavy and may be cumbersome to transport in large quantities. Moreover, the devices use fans to blow air over the ice in order to cool the air. While this method cools the ambient air surrounding the pet, it fails to cool the surfaces in contact with the animal's body, which is an effective means for effectuating heat transfer and cooling the pet.

Several devices for heating pet homes are disclosed by U.S. Pat. Nos. 5,216,977, 6,637,374, and 6,923,144 to Allen, Jr., Hawks et al., and Little, respectively. Allen's device comprises a pet home that features a loft that includes a removable, electric heating system. Hawks' device, meanwhile, discloses a system for heating a pet home by an air duct that features an inlet and an outlet at the interior of the pet home. The air duct features a heating element that heats the interior of the pet home. Little's device discloses a system for keeping a pet warm while within the home by heating the bed upon which the pet lies. Beneath the pet's bed is featured a water tank with a submersible heater that heats the water, and by conduction, also heats the pet bed. While these devices disclose systems for keeping pets warm while in pet homes, they fail to disclose systems that may also keep pets cool. Further, they fail to disclose systems that are portable or lightweight enough to also be compatible with pet carriers.

Systems for cooling and heating pet homes are disclosed by U.S. Pat. Nos. 4,827,872 and 5,746,271 to Sommers and DeCosta, respectively. Sommers' patent discloses a structure within a pet home that is surrounded by insulating materials, and heating and air cooling systems, such that the structure's temperature may be regulated. DeCosta's patent, meanwhile, discloses a climate controlled doghouse that features a heating and air conditioning unit mounted to its exterior surface. While both of these devices disclose systems that can cool and heat a doghouse, neither invention discloses systems that are compatible with portable pet carriers. Additionally, DeCosta fails to disclose a conduction system that is operable under any and all of the non-optimal conditions that a portable dog carrier may be subjected to, such unlevel ground.

Another problem with the DeCosta device involves the remote monitoring feature. First although DeCosta discloses a means to send and receive information related to temperature of the DeCosta dog house to and from a remote device, the remote monitoring device is located at a stationary area within the pet owner's home and is, thus, not portable. Second, the information shared between the "remote" within the pet owner's home and the DeCosta invention includes only numeric temperature data. Furthermore, the remote monitoring device only allows the owner to remotely adjust the interior temperature of the dog house based on minimum and maximum temperatures within the dog house. The minimum and maximum limitation is in place in order to evaluate the effectiveness of the dog house, not necessarily determine the ambient temperature at a certain moment. Thus, the purpose of the remote monitoring device is to check the performance of the invention, and not to observe the relative comfort of the pet and adjust accordingly.

U.S. Pat. No. 6,725,805 to Bach discloses another similar such device. Bach's patent discloses a pet shelter or incubator that features a heat generator and sensor that is responsive to the presence or absence of an animal inside. In this matter, Bach's patent discloses a device that is an incubator that is suitable for newborn and young animals. The device, however, is unsuitable for use as a pet carrier because it is relatively large, unwieldy, and requires a wall outlet for power.

A series of other systems, disclosed by U.S. Pat. Nos. 4,878,359, 4,939,911, and 5,887,436, issued to Mandell, Mandell, and Duddleston, respectively, disclose pet carriers and vehicular pet kennels that feature means for controlling the climate around the pets. Mandell's '359 patent, for example, discloses a travel accessory for persons who must leave their pets in a vehicle on a sunny day occasionally. In order to protect the pet from heat exhaustion, the device discloses a system for providing cooled air to the interior of the pet enclosure. The '359 patent discloses the use of a mechanical compressor in order to generate cooled air. The mechanical compressor is operated by the vehicles power or an alternate power source. While the '359 patent discloses a means for keeping pets cool while within the enclosure, it fails to disclose a system that can also be used to keep pets warm. Furthermore, because the device uses a mechanical compressor to cool the ambient air, it is relatively unwieldy and cannot easily be carried around by the pet owner.

Mandell's '911 patent discloses a similar such device while improving on the portability of the '359 device by using solid-state devices, such as Peltier modules, in order to cool the air. Like the '359 patent, however, the '911 patent fails to disclose a means for also heating the pet's surroundings. Furthermore, because both devices only cool the air surrounding the pet, their ability to transfer heat away from the animal is somewhat limited.

Duddleston's patent discloses a portable cooled pet carrier that uses Peltier modules in order to cool the interior of the enclosure. The device further features a slidable lid member that allows the user to select between circulating air for the pet or drawing new air into the enclosure from the external surroundings. Duddleston's device, however, suffers from some of the same shortcomings discussed above. First, it fails to disclose a means for providing both cooling and heating to the pet. Second, the device's efficiency in cooling the pet is somewhat limited because it cools the air around the pet, rather than the surfaces with which the pet comes into contact.

Another reference, U.S. Published Patent Application No. 2002/0184895, filed by Anderson, fails to remedy the limitations of the above references because it is not directed to heating a cooling a portable pet enclosure, and instead it is directed at a temperature-controlled dresser drawer. The Anderson device discloses a simple heat sink that is located within an air plenum and allows air to pass over a heat sink to heat or cool the single, small, and insulated drawer. However, Anderson utterly fails to disclose that the drawer is a living space for a pet. Indeed, the drawer is designed for food or medicines, which thrive in the absence of oxygen and fresh air, as opposed to pets, which need oxygen and fresh air to live. The use of the Anderson heating and cooling unit within an air tight drawer teaches away from using the Anderson heating and cooling unit with a portable pet living space.

In addition, the Anderson device, as disclosed, is inappropriate and much too inefficient to work with a portable pet carrier. Additionally, Anderson fails to disclose the heat sink that is claimed and disclosed in the present invention. The very standard type of heat sink disclosed in Anderson simply cools air as it passes over the fins. See FIGS. 4 and 5 in Anderson. The air is then ducted into the cooling cabinet, see FIG. 3 of Anderson, which is entirely a convection system, there is no suggestion or disclosure that the convection heat sink can be combined with a conduction system.

Furthermore, Anderson utterly fails to disclose or enable a single convection system for both hot and cold air. The Anderson convection system requires two, separate air plenums to circulate air in the drawer such that one air plenum is dedicated to heated air and the other air plenum is dedicated to cooled air. The two, separate air plenums are a required limitation of the Anderson device to effectively change the temperature within the drawer to the desired level for any convection system that uses a heat sink, air plenums, and fan. Anderson does not teach, suggest, disclose, enable, claim, or motivate the combination of air the air plenums.

Importantly, Anderson also fails to disclose a device that is portable. Indeed, the only motility of the Anderson device is on a horizontal plane within a dresser or piece of household cabinetry. This limited motility of the drawer allows the drawer to maintain the desired temperature level of the invention. Additionally, the Anderson device requires that the drawer is substantially air tight, which limits the uses for this device and precludes use as a portable pet enclosure. Therefore, Anderson fails to teach, suggest, or disclose a heating and cooling device that is appropriate for a pet enclosure.

Thus, there remains a long felt need in the art for a system for alternately heating and cooling pet kennels or carriers that can easily be transported, controlled remotely, and is efficient in heating and cooling the pet by heating or cooling both the air surrounding the pet and the surfaces upon which the pet lies.

Regulating both the surface temperature and the ambient air temperature of a pet is highly desirable for a number of reasons. First, in order to protect a pet from extreme temperatures, one must regulate the temperature encountered on all surfaces of the pet's body. Second, because a bed or bottom surface is in direct contact with the pet's body, it provides a highly effective means for heat transfer between a thermostatic device and the pet itself.

SUMMARY OF THE INVENTION

Various embodiments of the invention are directed towards overcoming the above shortcomings by disclosing a heating and cooling system for pet carriers or kennels that is portable enough to be easily transported and is efficient in heating and cooling the pet by heating or cooling both the air surrounding the pet and the surfaces upon which the pet lies.

The heating and cooling mechanism for various embodiments of the invention is a solid-state device such as a Peltier module or thermoelectric (TE) module. Current is supplied to the TE module by a power source, which could be any of a: battery; conductor that connects to a vehicle power source, such as a cigarette lighter outlet; conductor that connects to a wall outlet; rechargeable battery; power adaptor; or other such power source. The TE module is configured within the system to selectively supply heating or cooling by switching the direction of the current that flows through the TE module.

The heating and cooling mechanism in various embodiments of the invention may further feature a thermostatic control system. The thermostatic control system allows a user to select a desired temperature for the heating and cooling system, which the system accordingly adjusts to achieve the desired temperature adjustment. In various embodiments of the invention, the thermostatic control system comprises a system that increases the power supplied to the TE module in proportion to the difference between said inputted desired temperature and the measured temperature.

Various embodiments of the invention improve upon prior art systems by utilizing both conduction and convection means in order to cool the pet. Conduction means comprise, generally speaking, the transfer of heat to or from the pet's body through one or more surfaces that come into direct contact with the pet's body. Convention means comprise, generally speaking, the transfer of heat to or from the pet's body by blowing air over the pet's body. Because heat transfer can occur more efficiently through conduction than through convection, the system utilized by various embodiments of the invention performs, generally, more efficiently than related-art systems that rely only upon convection heating and cooling means. Meanwhile, because conduction only serves to cool the portions of the pet's body that are in direct contact with the heating/cooling surface, convection used in combination with conduction supplies more efficient and effective heating and cooling to the pet as a whole than either method used alone.

The conduction system, in various embodiments of the invention, comprises a conduction surface that conducts the heat or cold generated by the TE module. The conduction surface is placed at the floor surface of the pet kennel or enclosure, such that the pet's body is in direct contact with the conduction surface. In various embodiments of the invention, the conduction surface is surrounded by an additional platform area, which is not cooled or heated in order to allow the pet an alternatively area on which to stand that is not heated or cooled. The conduction surface is configured to come into contact with the TE module either directly or by an intermediary heat conducing material. In either case, as heat or cold is generated by the TE module, the conduction surface's temperature is efficiently altered because it is in contact with the TE module and heat conduction efficiently occurs between the two.

Meanwhile, because the conduction surface is configured within the pet enclosure such that it makes direct contact with the pet's body, it also performs effective heat conduction with the pet. Thus, heat or cold generated by the TE module is effectively transferred to the pet's body by the conduction surface. Because conduction is, generally, a more efficient means of performing heat transfer than convection, this system represents a marked improvement on prior art systems that only rely upon convection heating and cooling means. The conduction surface may be manufactured from any of the materials having high thermal conductivity known in the art, such as aluminum, steel, magnesium, copper, brass, tin, or any other such material that is known in the art. When combined with a convection system, the conduction system provides an effective and efficient means for cooling or heating a pet's entire body.

The convection system, in various embodiments of the invention, comprises a heat exchange surface, an air plenum, and an implement for inducing airflow, such as a fan. The heat exchange surface can be a heat sink configured to be in direct contact with the TE module such that heat conduction between the two occurs more efficiently. The heat sink may further feature an array of fin-like projections that are placed within the air plenum, over which air passes to aid in convection. In other embodiments, the conduction plate alone can act as the heat exchange surface.

The air plenum serves as an area for drawing air into the heating and cooling system, allowing heat convection to occur by passing the air over the heat sink, and allowing the heated or cooled air to exit to the interior of the pet enclosure. In various embodiments of the invention, the convection source is directed to the face of the pet in order to more effectively cool the pet. The air plenum, in various embodiments of the invention, draws air from a source outside of the pet enclosure, while in other embodiments, draws air from within the pet enclosure.

Another embodiment of the invention is a pet carrier, comprising: a portable pet carrier; one or more thermoelectric modules; a power source; one or more conduction surfaces; and one or more fans. The portable pet carrier is comprised of a ceiling, a floor, a plurality of walls, and one or more openings that allow the ingress and egress of pets to and from the portable pet carrier. The power source provides a current to the thermoelectric modules. The thermoelectric modules are configured to alternatively heat or cool the portable pet carrier. The pet carrier preferably includes a thermostatic control system, wherein the thermostatic control system is configured to control an operation of the thermoelectric modules by commanding the thermoelectric modules to alternatively generate heating or cooling. The control system distributes the current based on a calculated difference between a desired temperature and a measured temperature. The measured temperature is the temperature that a pet within the portable pet carrier experiences and it is adjusted towards the desired temperature through conduction and convection. The conduction surfaces are preferably part of the floor of the portable pet carrier; and they allow heat conduction to and from a body of the pet.

The pet carrier preferably further comprises one or more heat sinks and an air plenum. The heat sinks are fixedly connected to the thermoelectric modules and located such that a portion of the heat sinks is within the air plenum. The air plenum is configured to allow air to pass over at least a portion of the heat sink that is within the air plenum and into the portable pet carrier. The fan draws air through the air plenum and into the pet living space such that the portable pet carrier is heated or cooled simultaneously by the air passing through the air plenum and the conduction surfaces. The heat sinks further serve as a mounting device to connect the conduction surfaces to the thermoelectric modules and further serve to conduct heat to and from the conduction surfaces. The pet carrier further comprises one or more second heat sinks. The second heat sinks are connected to the opposite side of the thermoelectric modules that the heat sinks is mounted. The pet carrier may also include one or more second fans, which are configured to draw air over the second heat sink and out of the portable pet carrier. The heat sinks may also further be comprised of a mounting portion, which is mounted onto the thermoelectric modules that are fixedly connected to the portion of the heat sink within the air plenum, and is fixedly connected to the conduction surfaces.

The pet carrier may also be comprised of one or more vents, which direct the air passing through the air plenum into the portable pet carrier. The vents are closeable and include a directional control to vary the direction of the air passing through the air plenum into the portable pet carrier. The pet carrier also preferably includes a remote monitoring system and a remote monitoring device. The remote monitoring system sends and receives information related to a condition of the pet or an interior of the portable pet carrier.

Another embodiment of the invention is a pet living space, comprising: a pet living space; one or more thermoelectric modules; a power source; one or more conduction surfaces; one or more fans; and a thermostatic control system. The pet living space is comprised of a ceiling, a floor, a plurality of walls, and one or more openings that allow the ingress and egress of pets to and from the pet living space. Preferably, the power source provides a current to the thermoelectric modules and the thermoelectric modules are configured to alternatively heat or cool the portable pet living space. Preferably, the thermostatic control system is configured to control an operation of the thermoelectric modules by commanding the thermoelectric modules to alternatively generate heating or cooling. Preferably, the control system distributes the current based on a calculated difference between a desired temperature and a measured temperature and the measured temperature is the temperature that a pet within the portable pet living space experiences. The measured temperature is preferably adjusted towards the desired temperature through conduction and convection. The conduction surfaces are typically part of the floor of the portable pet living space and they allow heat conduction to and from a body of the pet. The pet living space may also include one or more heat sinks and an air plenum, wherein the heat sinks are fixedly connected to the thermoelectric modules and located such that a portion of the heat sinks is within the air plenum and wherein the air plenum is configured to allow air to pass over at least a portion of the heat sink that is within the air plenum and into the portable pet living space. The fan preferably draws air through the air plenum and into the pet living space such that the portable pet living space is heated or cooled simultaneously by the air passing through the air plenum and the conduction surfaces. The heat sinks may further serve as a mounting device to connect the conduction surfaces to the thermoelectric modules and further serve to conduct heat to and from the conduction surfaces. The pet living space may also include one or more second heat sinks; one or more second fans; and one or more vents. The second heat sinks are connected to the opposite side of the thermoelectric modules that the heat sinks is mounted to and the second fans are configured to draw air over the second heat sink and out of the portable pet living space. The heat sinks typically include a mounting portion, wherein the mounting portion of the heat sinks is mounted onto the thermoelectric modules, is fixedly connected to the portion of the heat sink within the air plenum, and is fixedly connected to the conduction surfaces. The vents preferably direct the air passing through the air plenum into the portable pet living space and they preferably include a closure and a directional control to vary the direction of the air passing through the air plenum into the portable pet living space. The pet living space may also include a remote monitoring system and a remote monitoring device, wherein the remote monitoring system sends and receives information related to a condition of the pet or an interior of the portable pet living space. The pet living space may be a pet kennel, a pet carrier, a doghouse, or any other type of pet enclosure.

In various embodiments of the invention, the airflow implement comprises one or more types of electrical fans known in the art. Various types of electrical fans are known within the art and remain within the contemplation of the invention, including but not limited to axial fans, centrifugal fans, radial fans, cross flow fans, tangential fans, and any other such fan types that are known within the art. The fan operates, generally speaking, by inducing airflow through the air plenum to be passed over the heat sink or heat exchange surface.

In various embodiments of the invention, the heat sink or heat exchange surface additionally serves as a means for connecting the conduction surface, both physically and thermally, to the thermoelectric module.

Various embodiments of the invention further feature a second heat sink and second heat sink fan. The second heat sink is located at the side of the thermoelectric module opposite the first heat sink. The second heat sink fan serves to draw air over the second heat sink and out of the pet enclosure. In this manner, the combined first and second heat sink fans are more efficient in circulating heated or cooled air using less power. This embodiment is more efficient because the first heat sink fan does not need to distribute the air into the pet enclosure independently and the second heat sink facilitates the more efficient operation of the heating and cooling system.

Because of the relative efficiency of conduction as a means of heat transfer, the principles of the invention may be practiced without the use of the convection methods that are claimed in other embodiments of the invention. In these embodiments that only utilize conduction methods, the elements of the device that are required for convection are eliminated, thus, reducing manufacturing costs. Meanwhile, because these embodiments allow both heating and cooling while relying upon thermoelectric technology, they represent a marked improvement on related art devices, such as Peeples'. While Peeples discloses the use of thermoelectric modules to perform heating and cooling for pet beds, it fails to disclose a pet enclosure that performs both heating and cooling through both convection and conduction nor is it obvious to combine the conduction heating and cooling pet bed with a standard pet enclosure. Peeples' rather relies upon the convection heating or cooling of a ring of air that surrounds the pet bed. This system is relatively inefficient in exchanging heat with the pet in comparison to the systems disclosed by various embodiments of the invention.

Various embodiments of the invention further feature a remote monitoring system, which allows the user to monitor the pet and the condition of the pet enclosure remotely. The remote monitoring system allows the transmission of audio signals, still photo signals, video signals, physical vibration information, or temperature information, to a portable or stationary remote monitoring device, and may feature an imaging device. The remote monitoring device may be any of the various devices for remote monitoring known within the art, including but not limited to, computers, internet compatible devices, cellular devices, personal data assistants, or closed circuit televisions.

The principles of the invention may be practiced with any of the various pet carriers, pet kennels, pet enclosures, doghouses, or similar such pet living spaces or carrying cases known in the art. The pet living spaces may be manufactured from plastic, polyurethane, fiber reinforced plastic, anti-microbial molded plastic, cardboard, wood, metal, metal alloy, fiberglass, or any other materials known within the art to be used for manufacturing pet living spaces or carrying cases. The invention may be packaged as a stand-alone modular unit that can be variably outfitted to any of these various pet living spaces or carrying cases, or as an integrated portion of said pet living spaces or carrying cases. These, and other implementations of heating and cooling systems, remain within the contemplation of the invention.

Figure 2:
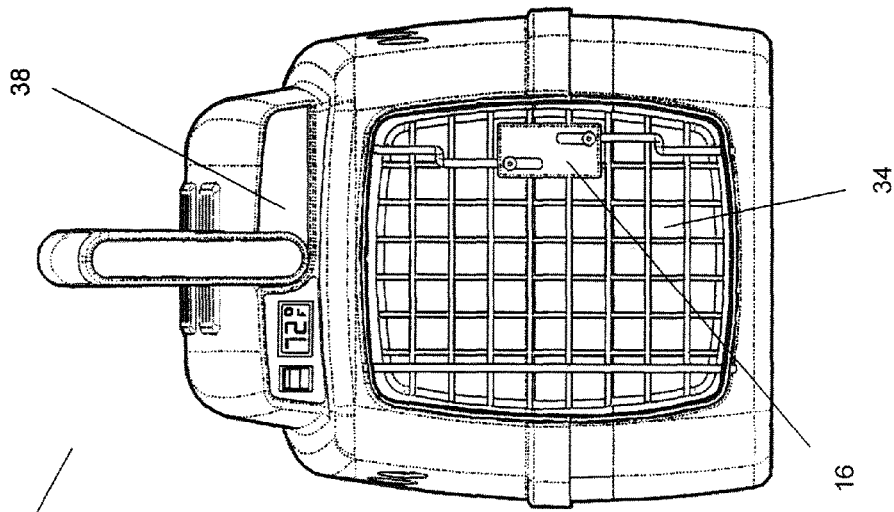
FIG. 2 is a front perspective view of one embodiment of the invention.

DRAWINGS—REFERENCE NUMERALS 10 pet carrier
11 enclosure
12 top wall
13 bottom wall
14 side wall
15 back wall
16 openable access port
17 upper enclosure
18 lower enclosure
19 handle
20 external air intake port
21 vent
22 thermoregulatory unit
23 external air exhaust port
24 internal air intake port
25 internal air exhaust port
26 upper fan
27 lower fan
28 thermoelectric element
29 internal heat exchanger fins
30 external heat exchanger fins
31 battery
32 control printed circuit board
33 ceiling barrier
34 resilient panel
35 imaging device
37 horizontal divider
38 control panel
39 upper chamber
40 lower chamber
42 remote control device
43 wall
44 control chamber
45 visual display
46 buttons
110 thermoregulatory unit
113 external heat exchanger fins
114 vertical divider
116 internal heat exchanger fins
117 internal deflector
118 fan
121 external chamber
122 internal chamber
123 thermoelectric element I
124 thermoelectric element II
1310 heating and cooling system
1315 platform
1320 conduction surface
1325 insulation and ductwork assembly
1330 second heat sink
1335 heat sink fan
1340 airflow fan
1345 first heat sink
1410 heating and cooling system
1415 platform
1420 conduction surface
1425 insulation and airduct assembly
1430 second heat sink
1435 second heat sink fan
1440 airduct fan
1450 Peltier module
1455 opening 1460 first heat sink
1525 air duct
1560 first heat sink
1620 conduction surface
1625 heat sink
1630 second heat sink
1635 fan II
1640 fan I
1650 Peltier thermoelectric modules
1655 vent
1660 mounting blocks
1665 conduction block
1670 temperature control
1690 air plenum

DETAILED DESCRIPTION OF THE DRAWINGS

In the following detailed description of various embodiments of the invention, numerous specific details are set forth in order to provide a thorough understanding of various aspects of one or more embodiments of the invention. However, one or more embodiments of the invention may be practiced without these specific details. In other instances, well-known methods, procedures, and/or components have not been described in detail so as not to unnecessarily obscure aspects of embodiments of the invention.

While multiple embodiments are disclosed, still other embodiments of the present invention will become apparent to those skilled in the art from the following detailed description, which shows and describes illustrative embodiments of the invention. As will be realized, the invention is capable of modifications in various obvious aspects, all without departing from the spirit and scope of the present invention. Accordingly, the drawings and detailed description are to be regarded as illustrative in nature and not restrictive. Also, the reference or non-reference to a particular embodiment of the invention is not intended to, and shall not be interpreted to, limit the scope the invention in any way. Various embodiments of the invention remain useable in tandem or in combination of one another.

In this detailed description, certain terminology is used to describe certain features of one or more embodiments of the invention. For instance, "pet living space" refers to any pet kennel, pet carrier, dog house, pet enclosure, or other such pet living space known in the art, and "thermoelectric module" refers to any Peltier device, TE module, or other solid-state device for generating heating and cooling that is known in the art.

Figure 1:
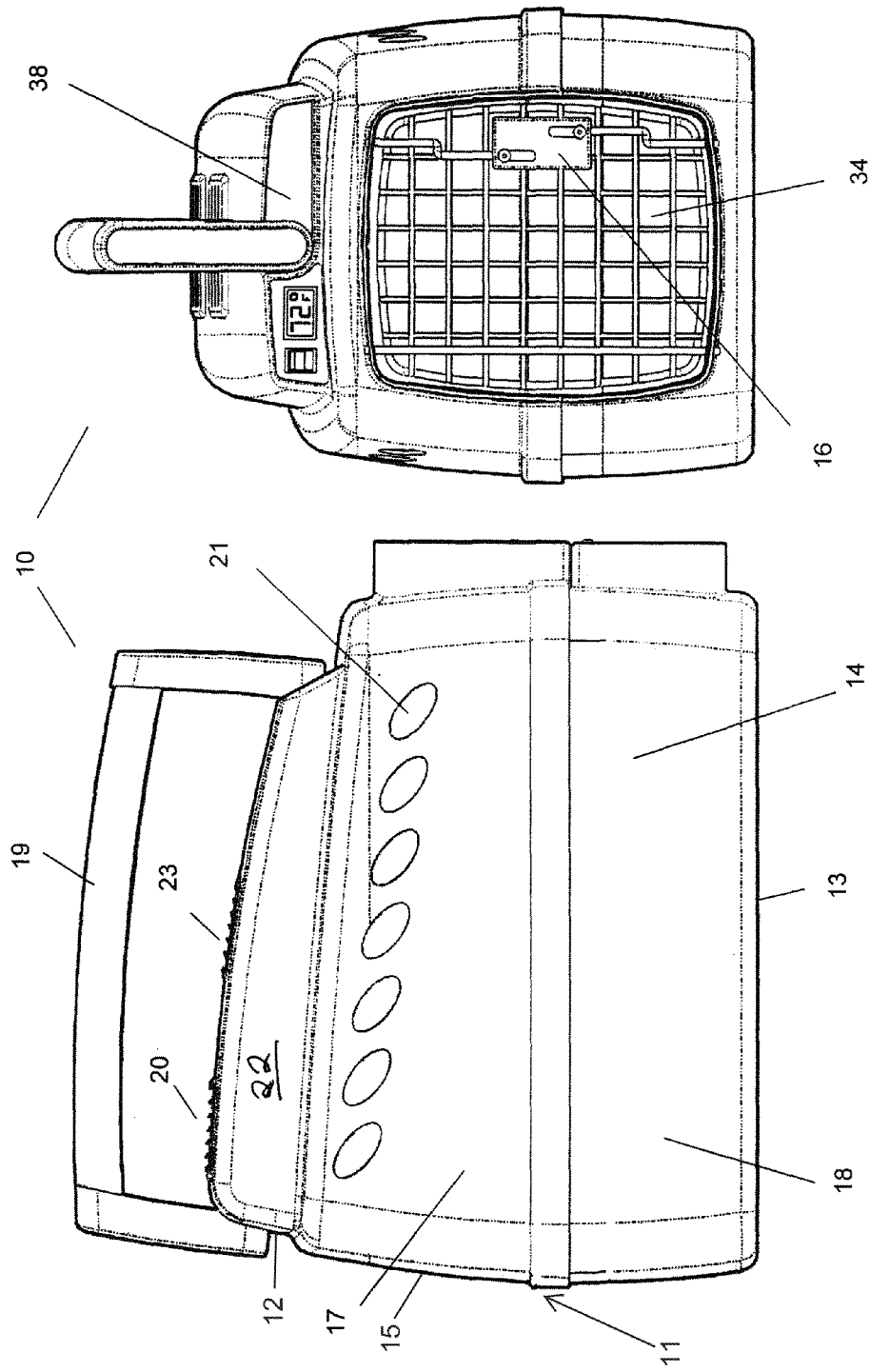
FIG. 1 is a side perspective view of one embodiment the invention.

Referring to FIGS. 1 and 2, shown therein is a pet carrier 10 according to the first embodiment of the present invention. The carrier 10 includes a pet enclosure portion 11 including top 12, bottom 13, side 14, rear walls 15 and an openable access port 16, which define a space into which a pet can comfortably be received. A resilient panel 34 is removably attached to the inside of the openable access port 16 by removable detent elements in the form of screws. As will be understood by those skilled in the art, other forms of detents can be employed if desired. The resilient panel 34 does not completely cover the door 16 but leaves a gap, ranging from 1 cm to 30 cm, around its perimeter to allow air to be exchanged between the outside and the inside of the pet enclosure. The pet enclosure portion 11 is also divided into upper 17 and lower 18 detachable enclosure portions, which are removably connected together by removable detents. The upper and lower enclosures of the carrier can be disassembled if need be, for transport, or to gain better access for cleaning. There are vents 21 on the sides of the upper enclosure portion, which permit air therein to be replenished by fresh air. A handle 19 is positioned on the top of the housing/kennel to facilitate movement of the carrier. A thermoregulatory unit 22 is located at the ceiling side of the upper enclosure 11.

Figure 3:
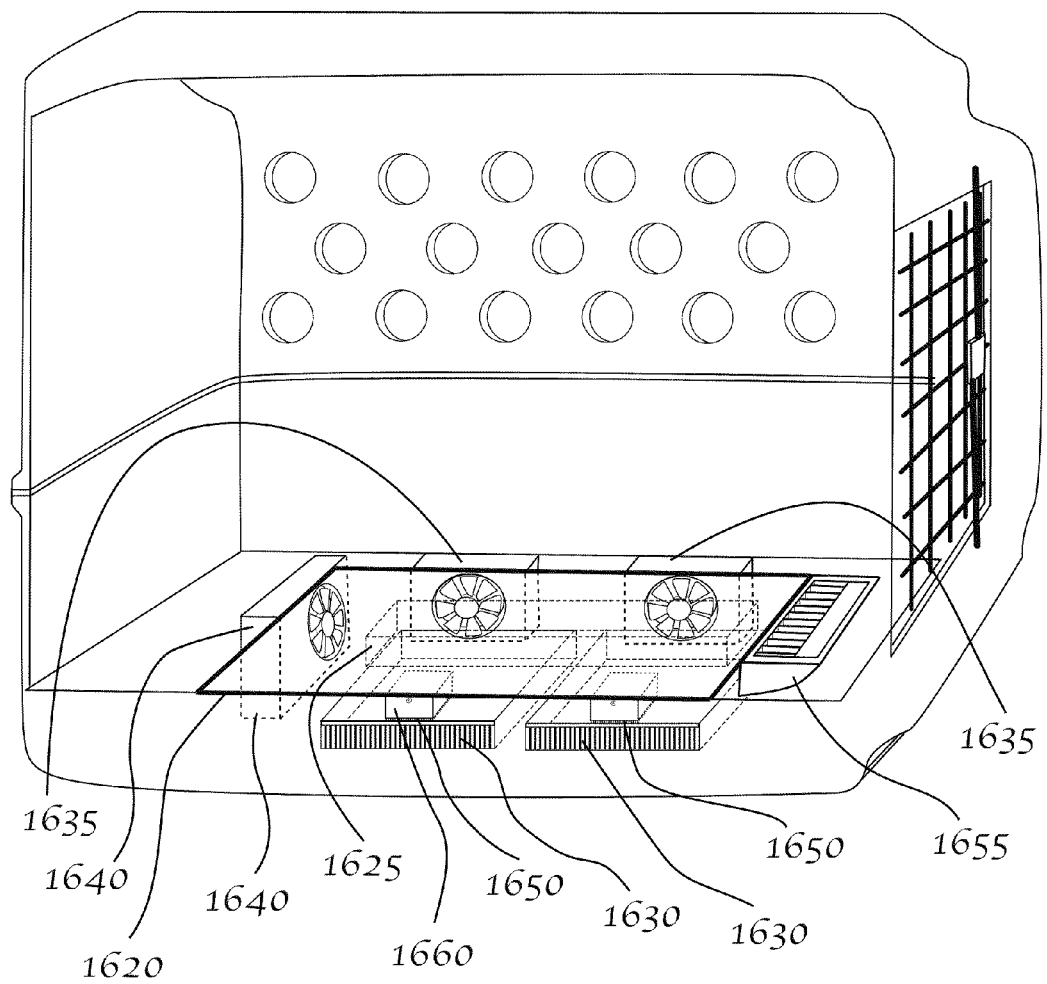
FIG. 3 is a cross-sectional perspective view of one embodiment of the invention.

FIG. 3, a cross-sectional perspective view of the pet carrier, showing a thermoregulatory unit reveals a detachable ceiling barrier 33, which separates the thermoregulatory unit from the upper enclosure 17. The barrier 33 can be disengaged by removing some detents. The thermoregulatory unit 22 comprises external 20 and internal 24 air intake ports; external 23 and internal 25 air exhaust ports; upper 26 and lower 27 fans; a single thermoelectric element 28; upper 39 and lower 40 chambers; external 30 and internal 29 heat exchanger fins; thermal control printed circuit board 32, imaging device 35, and control panel 38 to operate the unit either manually, automatically, and/or remotely. Alternative embodiments could include more than one single thermoelectric element 28.

The external air intake ports 20 and external air exhaust ports 23 are unconnected to and separated from the internal air intake 24 and internal air exhaust ports 25, respectively, by a horizontal divider 37, thereby creating an upper 39 and a lower 40 chamber. This divider 37 prevents ambient air from mixing with air from the pet enclosure, thereby limiting the volume of air that needs to be temperature-regulated by the thermo-regulatory unit 22.

Figure 4:
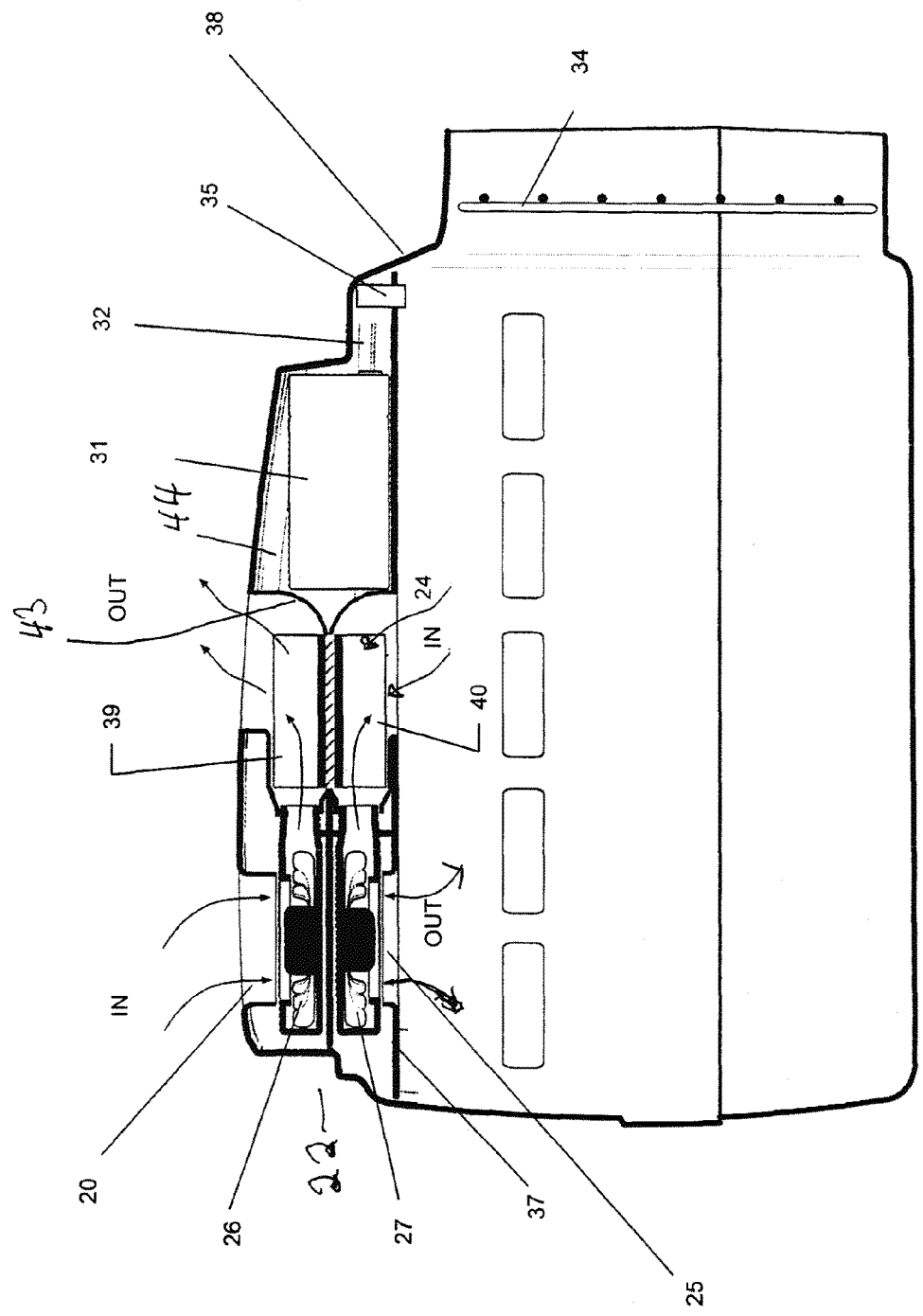
FIG. 4 is a cross-sectional perspective view of one embodiment of the invention.

FIG. 4 shows a preferred thermoregulatory unit 22 for the first embodiment, which utilizes two fans and one thermoelectric element 28. The typical thermoelectric element is manufactured using two thin ceramic wafers with a series of P and N doped bismuth-telluride semiconductor material sandwiched between them, but other materials are within the contemplation of the present invention. Connected to the thermoelectric element 28 are the external 30 and internal heat exchanger fins 29. The external and internal fins are composed of materials including, but not limited to, copper and aluminum. There can be more than one thermoregulatory unit 22 and each may have more than one thermoelectric element 28.

In one embodiment, the thermoregulatory unit 22 is powered by a battery 31 connected thereto (e.g., a stand-alone battery or the vehicle battery). The battery 31 is placed within the control chamber 44, which is sealed from the upper and lower chambers by a wall 43. In a preferred embodiment, one or more stand alone batteries are used so that the charge on the vehicle's primary battery is not depleted. It is also understood that the battery can be included as part of the carrier itself, or can be positioned separately in the vehicle and connected to the carrier by appropriate cables. In another aspect, the pet carrier can be provided with 110 volt AC to 12 volt DC power inverters so that the carrier can be used in a house, office, or outdoors, or may run on energy generated from solar panels. In practice, any power source could be used to power the unit. It is possible to conserve battery power of the unit if the owner selects only to operate the lower fan, and not also the upper fan and thermoelectric elements, in a more comfortable environment.

Also within the control chamber 44 of the thermoregulatory unit 22 is the imaging device 35. The imaging device 35 is removably affixed to the upper ceiling of the regulatory unit and imaging device 35 is able to point back inside the enclosure to capture moving images and/or still images of the pet inside the unit.

As the TE operates, the current flowing through it can create two possible effects: (1) the Peltier Effect (cooling) and (2) the Joulian Effect (heating). DC current applied across dissimilar materials causes a temperature differential. Using a thermoelectric device in the heating mode is very efficient because all of the internal heating (Joulian heat) and the load from the cold side are pumped to the hot side. This reduces the power needed to achieve the desired heat. Thermoelectric elements can be stacked to achieve even lower temperatures.

For one embodiment, when the thermoregulatory unit is in the heating mode, the action of the lower fan 27 gently pushing air into the enclosure through the internal exhaust port 25 creates an air current that results in air from the enclosure being gently pulled up into the lower chamber 40 through the internal intake port 24. Here the air encounters the internal heat exchanger fins 29, which are heated. The resultant warm air is then pulled back through to the lower fan 27. As this is happening, the upper fan 26 is extracting ambient air through the external air intake port 20. The ambient air is then blown across into the upper chamber 39, where it encounters the external heat exchanger fins 30, which are chilled. The resulting cool air is then expelled outside of the pet carrier by flowing through the external air exhaust port 23.

When the thermoregulatory unit is in the cooling mode, the action of the lower fan 27 gently pushing air into the enclosure through the internal exhaust port 25 creates an air current that results in air from the enclosure being gently pulled up into the lower chamber 40 through the internal intake port 24. Here the air encounters the internal heat exchanger fins 29, which are chilled. The resulting cool air is then pulled back through to the lower fan 27 (see FIG. 4). As this is happening, the upper fan 26 is extracting ambient air through the external air intake port 20. The ambient air is then blown across into the upper chamber 38, where it encounters the external heat exchanger fins 30, which are now heated. The resultant warm air is then expelled, through the external air exhaust port 23, outside of the pet enclosure. Vents 21 as well as the air gap between the door 16 and the resilient panel 34 ensure that sufficient fresh air can be exchanged between the enclosure and the outside. As mentioned above, the presence of the divider 37 prevents air from the upper and lower chambers from mixing.

The circuitry in one embodiment that supports the digital temperature sensor comprises a temperature sensor feedback (thermistor or solid-state sensor) with a closed-loop control circuit to control/regulate the temperature. Using the thermistor, for example, the regulatory unit would be able to determine the current temperature within the pet enclosure, and then determine if the thermoregulatory unit should be placed in a COOL, HEAT, or OFF mode. When the sensor detects an over temperature condition within the enclosure, the thermoregulatory unit 22 is activated to begin cooling the air inside the enclosure. Alternatively, when the sensor detects an under temperature condition within the enclosure, the unit 22 is activated to begin heating the air. In another embodiment, a temperature may be selected and the unit can turn on and off keeping the carrier 10 within the selected temperature range.

Figure 7:
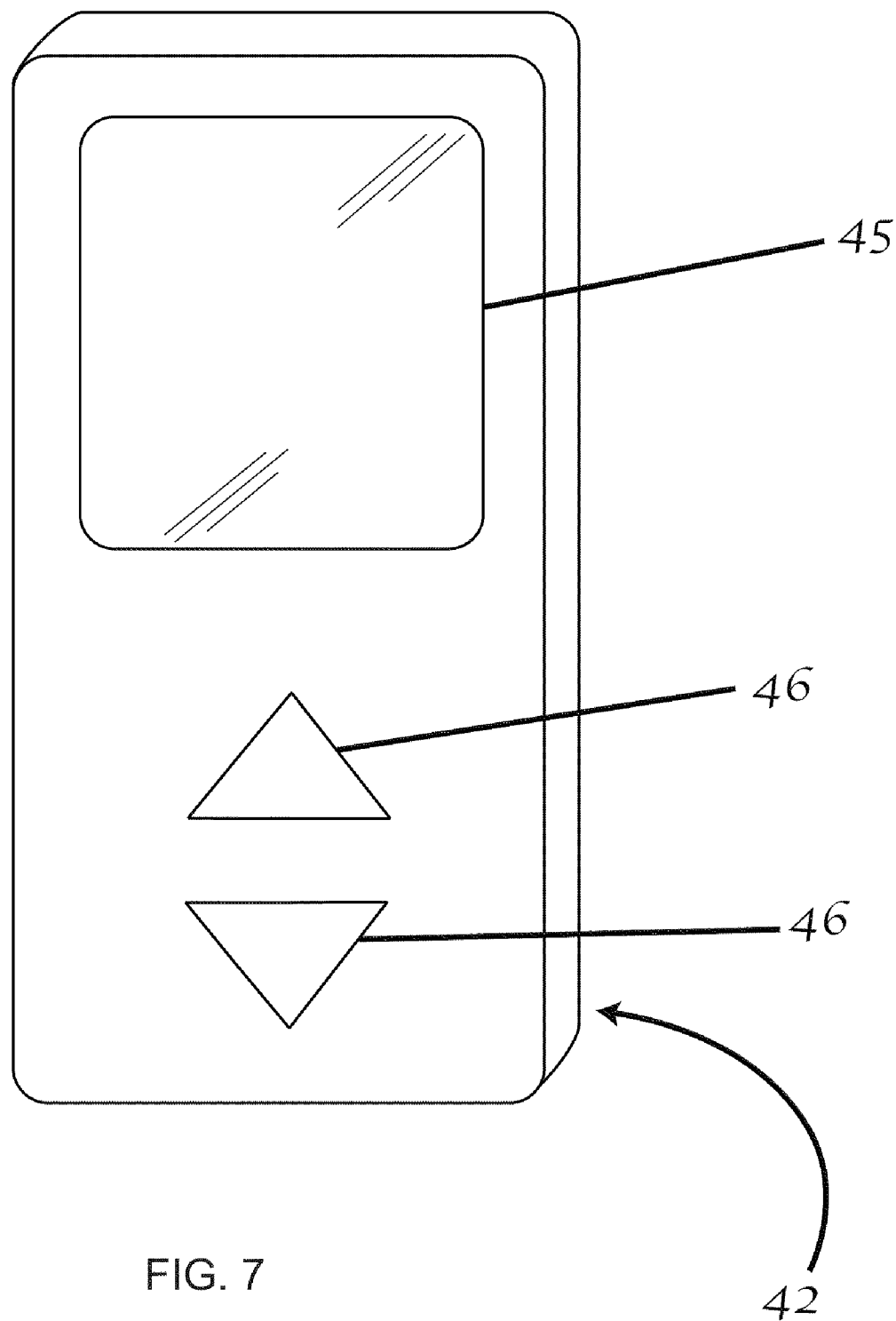
FIG. 7 is a front perspective view of the remote control device in accordance with one embodiment of this invention.

There are also circuitries, within the printed circuit board 32, that control the imaging device 35, as well as those to the transmitter/receiver unit, which enables the pet carrier to transmit and receive signals/images to and from a remote control device 42 (see FIG. 7). In one embodiment, the carrier will use a transmitter/receiver unit that incorporates existing cell phone technology to achieve this purpose. The remote device 42 would be able to display a temperature indicator so that the pet owner can discern the temperature inside the carrier remotely. The remote control device 42 can display information such as visual and/or audio alarms (or vibration mode similar to a paging device) on a visual display 45 when the temperature reaches a certain threshold, as well as still and moving images within the enclosure. The remote control device 42 may include buttons 46 to adjust the desired temperature or scroll through the setting options. Alternatively, the remote control device 42 can contain virtual buttons and limit the need for physical buttons 46 on the exterior of the device 42. The remote control device can be specifically manufactured and supplied with the pet carrier, or could be a user's cell phone/PDA/computer. In the latter case, conventional software would be installed to allow these devices to receive and transmit information to and from the kennel. Information defined here includes, but is not limited to: text; still images; moving images; sounds; vibrations; or any combination thereof. It is also understood that a global positioning satellite unit, as well as its circuitry, could be adapted to work with this first embodiment.

One embodiment can be fabricated using a number of different materials including, but not limited to, anti-microbial coated molded plastic, extruded or molded polymer, enhanced polymer, cardboard, wood, metal or fiber glass. In another aspect, the inside walls of the carrier could be coated with insulated fabric composed of materials known in the art as insulators, including, but not limited to, poly-fiber. The openable access port 16 can be made of the same material as the carrier itself but may include a gasket disposed on an inside of the gate, and a resilient panel 34 made of materials including, but not be limited to, Plexiglas™ (Rohm and Haas Company, Independence Mall, West Philadelphia, Pa. 19195), glass, or plastic. Alternatively, the openable access port for the first can be made of a more flexible type of material including, but not limited to, fabric and fabric and metal mesh netting, in which case the resilient panel 34 is not needed. In the second embodiment, the openable access port for the kennel is plastic flap-type, commonly used for dog doors; or alternatively, it may comprise multiple strip(s) of fabric, or plastic material, hanging down from the top of the openable access port frame, similar to those used in freezer rooms.

Figure 6:
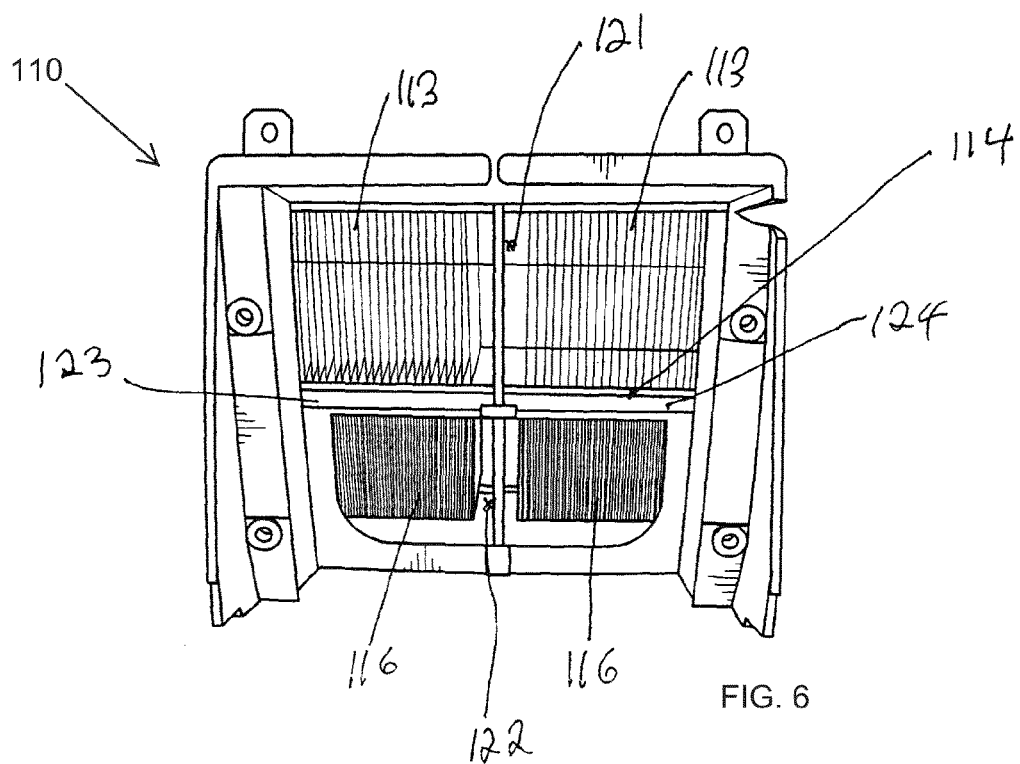
FIG. 6 is another side perspective view of the thermoregulatory unit of one embodiment of the invention.
Figure 5:
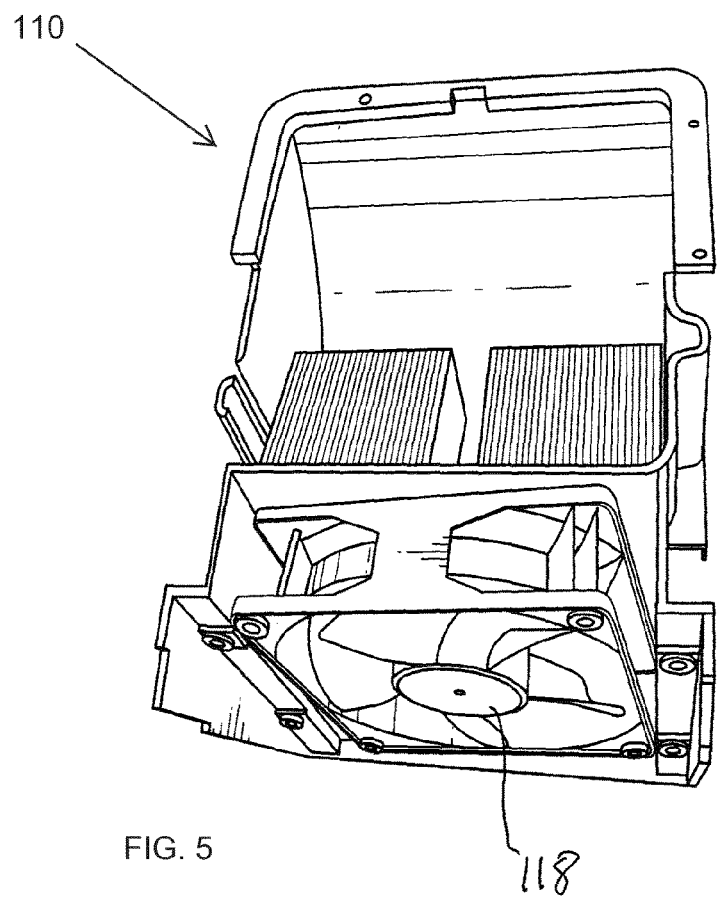
FIG. 5 is a side perspective view of the thermoregulatory unit of one embodiment of the invention.

FIGS. 5 and 6 are side perspective views of a thermoregulatory unit 110 used in one embodiment of the invention. The internal area of the unit 110 is comprised of two halves separated by a vertical divider 114. Each half contains internal heat exchanger fins 116 within an internal chamber 122. The exterior of the unit 110 contains two hemispheres wherein each hemisphere contains external heat exchanger fins 113 in an external chamber 121. A fan 118 passes air between the internal 122 and external chambers 121. This embodiment also contains two thermoelectric elements I and II, 123 and 124, respectively.

Figure 8:
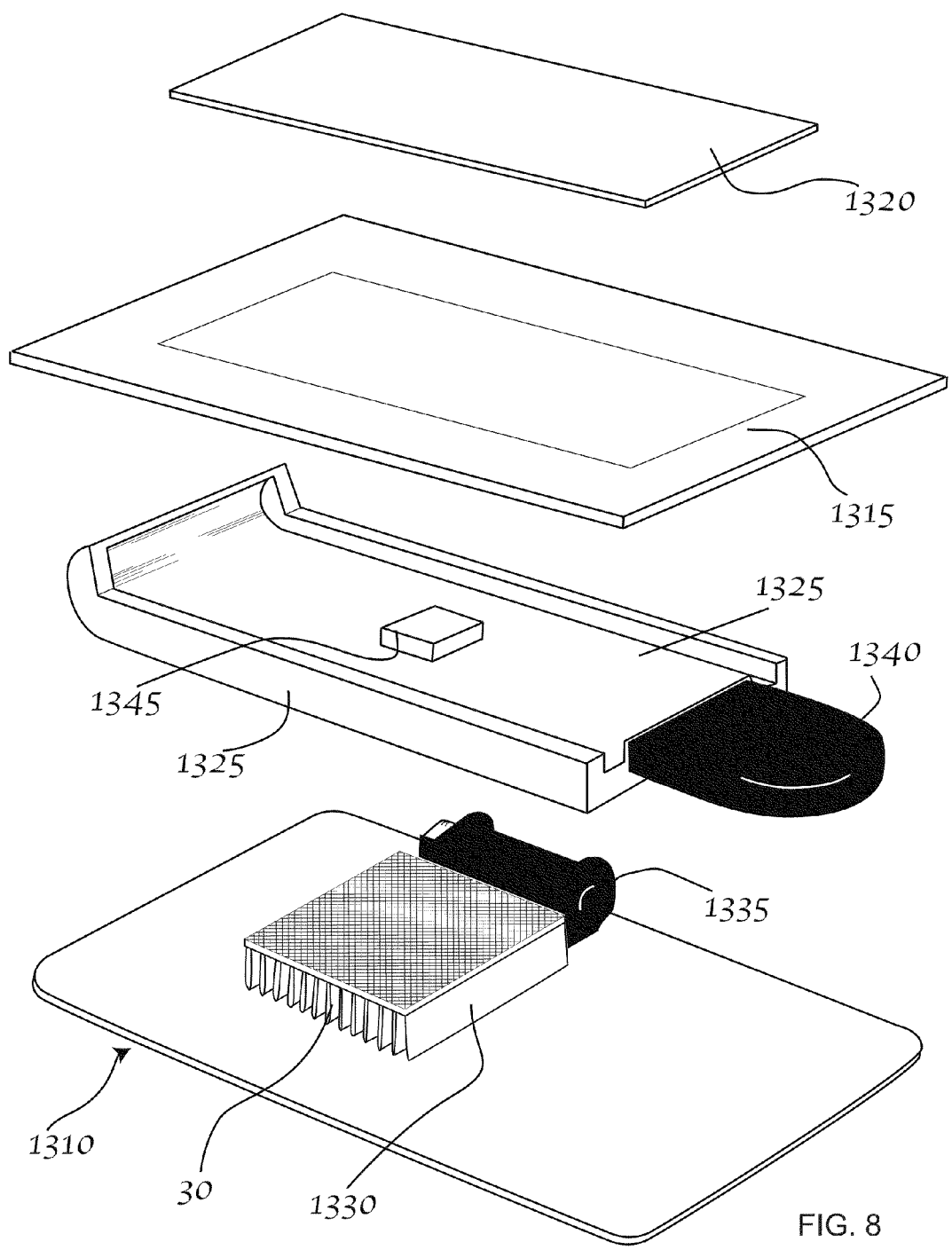
FIG. 8 is an exploded detailed view of a heating and cooling system of one embodiment of the invention.

FIG. 8 is an exploded detailed view of a heating and cooling system of one embodiment of the invention. The constituent parts of the heating and cooling system 1310 are displayed, including: the platform 1315, the conduction surface 1320, the insulation and ductwork assembly 1325, the first heat sink 1345, the second heat sink 1330, the airflow fan 1340, and the heat sink fan 1335. As detailed above, the conduction surface 1320 performs important aspects of the heating and cooling functions through conduction. In this embodiment of the invention, cold or heat is supplied from the Peltier module to the conduction surface 1320 by the first sink 1345. The other portions of the heating and cooling system 1310, meanwhile, assist in the cooling or heating the remainder of the pet's body through convection. The convection system operates, generally speaking, by blowing air that is heated or cooled by the Peltier modules over the pet's body. As air is drawn by the airflow fan 1340, it passes across the first heat sink 1345 and the conduction surface 1320, where it is cooled or heat. Then, the air is drawn into the pet enclosure in order to cool or heat the pet. The second heat sink 1330 and heat sink fan 1335, meanwhile, serve to create a greater temperature differential between the two opposite surfaces of the Peltier module and, thus, more efficient operation of the heating and cooling system 1310.

Figure 9:
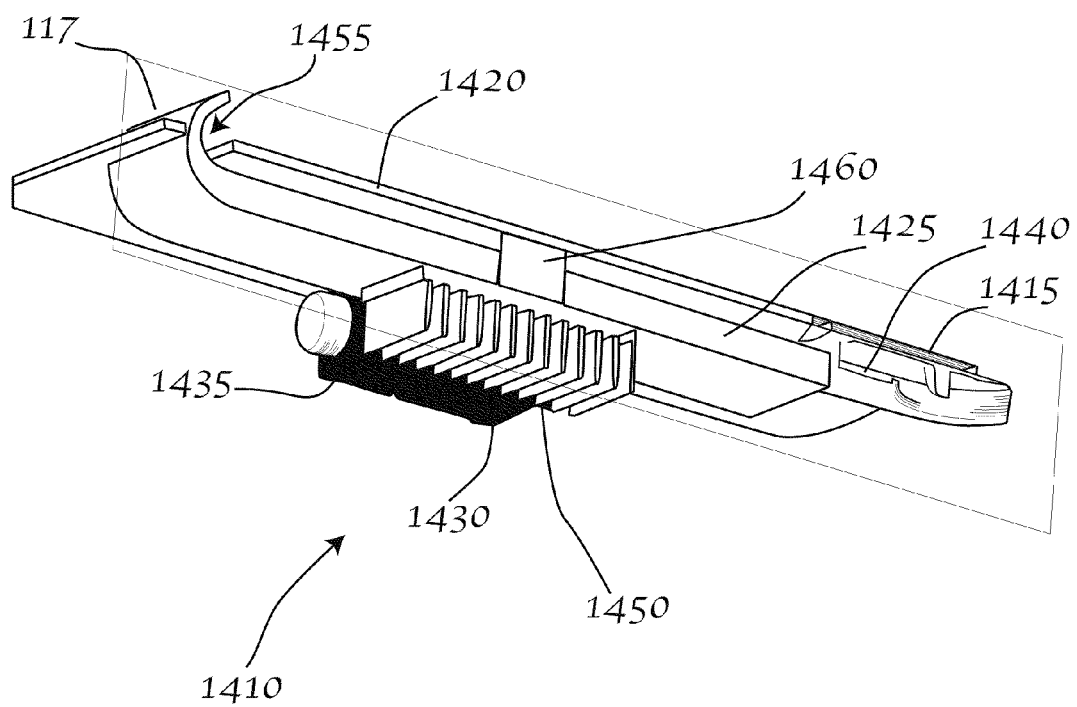
FIG. 9 is a cut-away section of a heating and cooling system of one embodiment of the invention.

FIG. 9 is a detailed cut-away section of a heating and cooling system of one embodiment of the invention. In this detailed cut-away section illustration, the various parts of the heating and cooling system 1410 for a pet enclosure are illustrated, including: the platform 1415, the conduction surface 1420, the insulation and airduct assembly 1425, the Peltier module 1450, the first heat sink 1460, the second heat sink 1430, the second heat sink fan 1435, the internal deflector 117, and the airduct fan 1440. As illustrated in the figure, the heating and cooling system 1410 facilitates cooling both by conduction, via the conduction surface 1420 and convection, via the airduct system. The first heat sink 1460 conducts heat or cold from the thermoelectric module to the conduction surface 1420. In this embodiment of the invention, the first heat sink 1460 is located within the airduct assembly 1425 such that air drawn by airduct fan 1440 over the first heat sink 1460 is heated or cooled. The airduct and insulation assembly 1425 features an opening 1455 at its end opposite the airduct fan 1440, which allows blown air to exit into the pet enclosure. In various embodiments of the invention, this opening 1455 may be configured to direct air towards the pet's face and, thus, effectively cool the pet. The second heat sink 1430 is located at the opposite end of the Peltier module 1450 of the first heat sink 1460 and features a second heat sink fan 1435 in order to assist in thermal exchange with the second heat sink 1435. In this manner, the second heat sink 1435 and second heat sink fan 1435 to facilitate more efficient operation of the heating and cooling system 1410. Also in this embodiment, the internal deflector 117 is part of the plenum that allows air to be directed.

Figure 10:
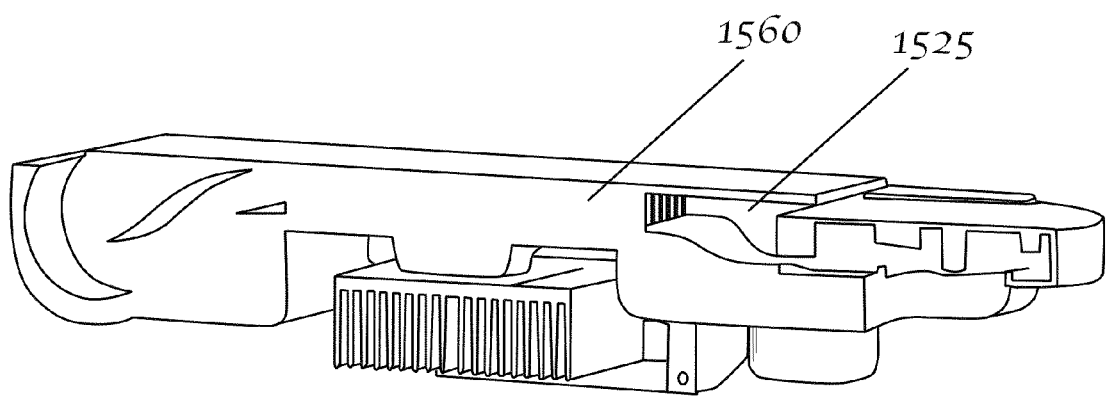
FIG. 10 is a perspective cut-away section of a heating and cooling system of one embodiment of the invention.

FIG. 10 is a perspective cut-away section of a heating and cooling system of one embodiment of the invention. FIG. 10 shows an embodiment in which the first heat sink 1560 has fins in the air duct 1525 to improve heat transfer.

Figure 11:
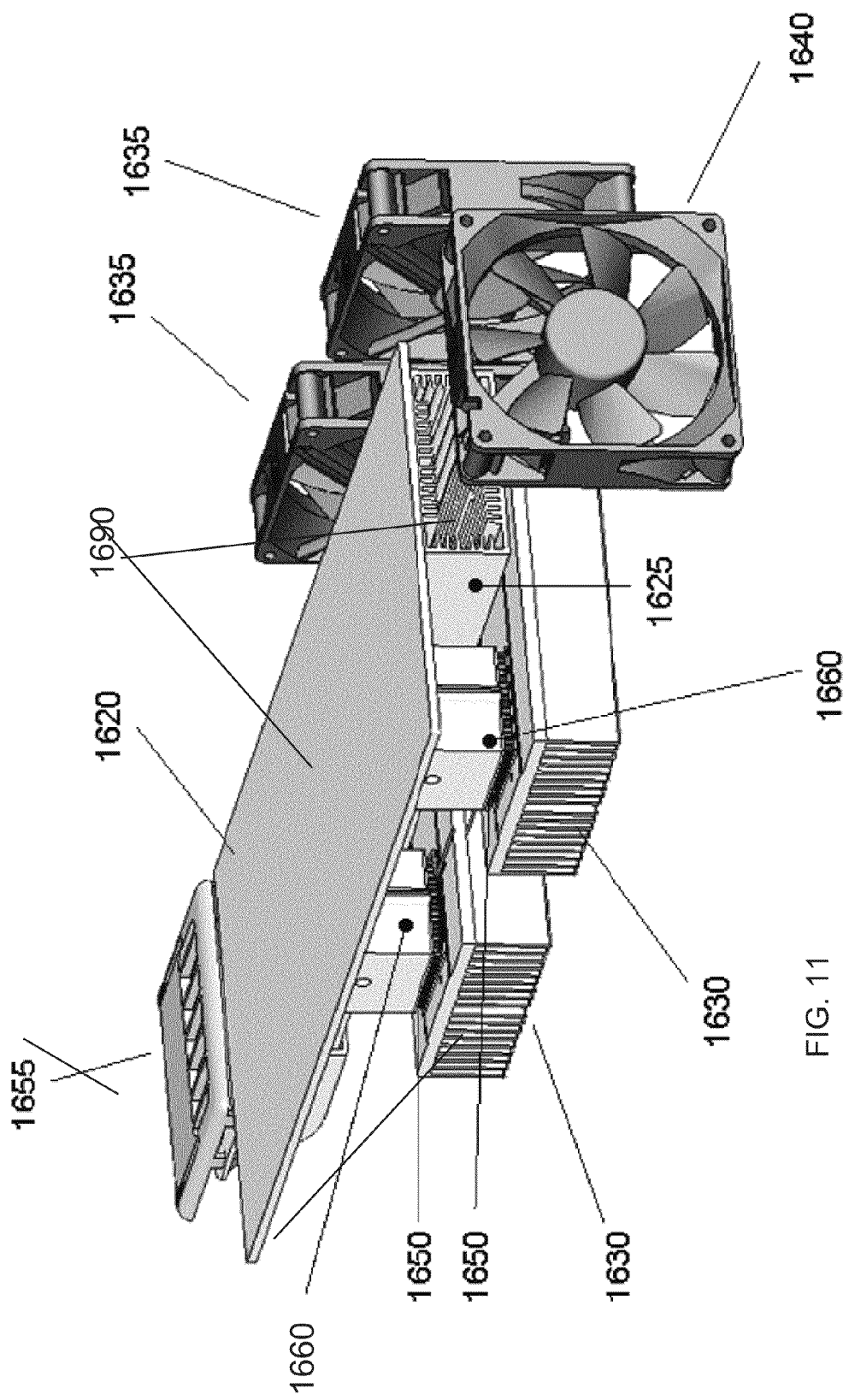
FIG. 11 is a perspective detailed view of a heating and cooling system of one embodiment of the invention.

FIG. 11 is a perspective detailed view of a heating and cooling system of one embodiment of the invention. FIG. 11 shows an embodiment that uses two Peltier thermoelectric modules 1650. The thermoelectric modules are attached to a first heat sink, which in FIG. 11 is shown as being made up of the two mounting blocks 1660 and heat sink 1625. As shown in FIG. 11, the conduction surface 1620 is preferably fixedly connected to the first sink, in this case mounting blocks 1660 and heat sink 1625. Heat sink 1625 is preferably within or in contact with air plenum 1690. In this manner the first heat sink simultaneously heats or cools the conduction surface (through mounting blocks 1660) and the air within air plenum 1690. Fan 1640 draws the air within air plenum 1690 over heat sink 1625 (heating or cooling the air), out vent 1655, and into the pet enclosure in which the heating and cooling system preferably resides. In this manner a pet within the pet enclosure is heated or cooled by both conduction and convection means. The heating and cooling system also preferably includes second heat sinks 1630 and second fans 1635, which dissipate and/or exhaust the hot air if cooling or cold air if heating.

Figure 12:
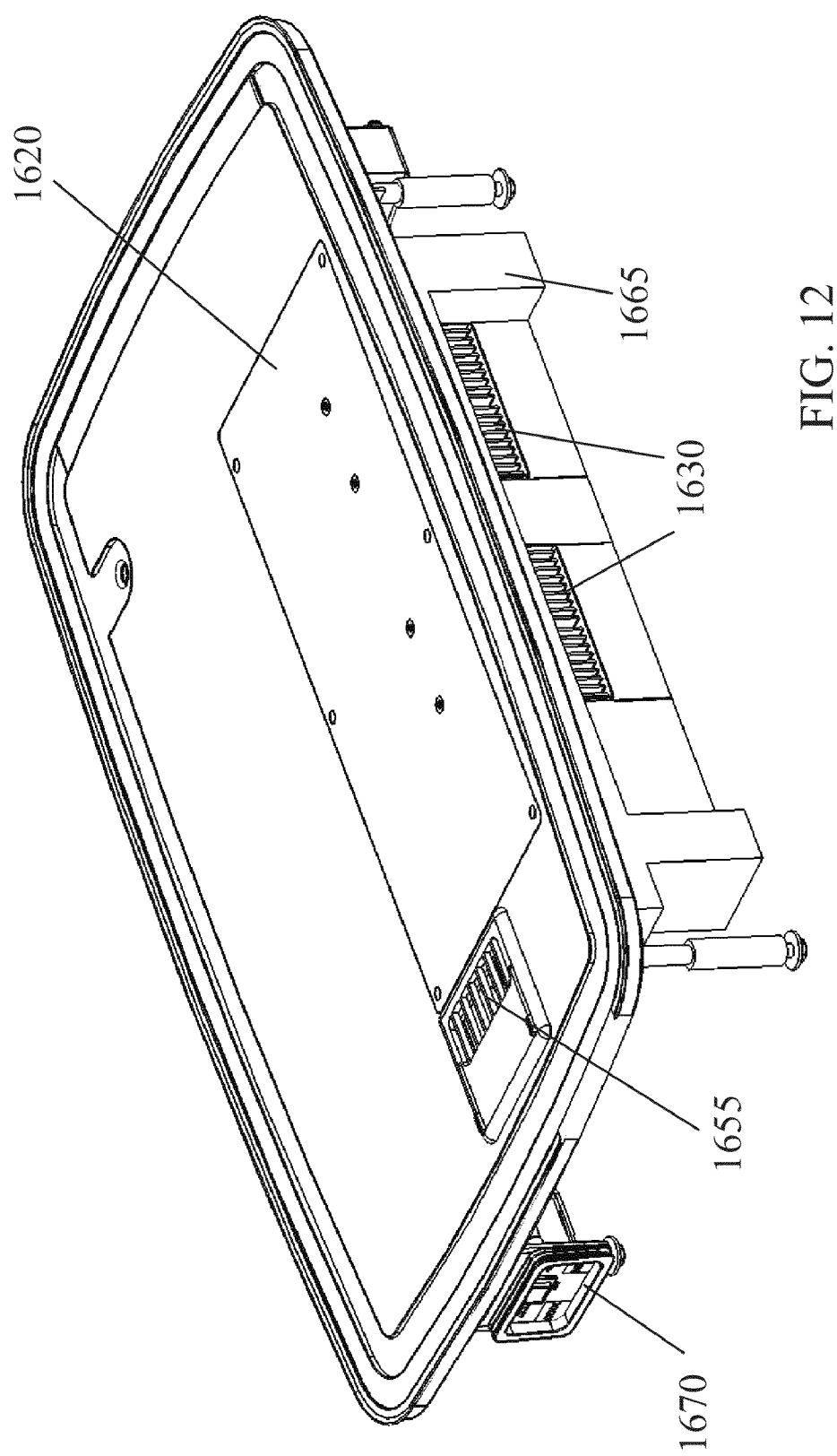
FIG. 12 is a front perspective view of the heating and cooling system of one embodiment of the invention.

FIG. 12 is a perspective view of a heating and cooling system of one embodiment of the invention. FIG. 12 shows how the heating and cooling system may include second heat sinks 1630, conduction surface 1620, conduction block 1665, vent 1655, and controller 1670. FIG. 12 shows how the conduction surface is preferably part of a floor of a pet kennel and allows a pet to lay down on the conduction surface with the vent pointed at the pets face. The controller 1670 allows the user to set the desired temperature of the pet carrier in which the heating and cooling system is part.

Figure 13:
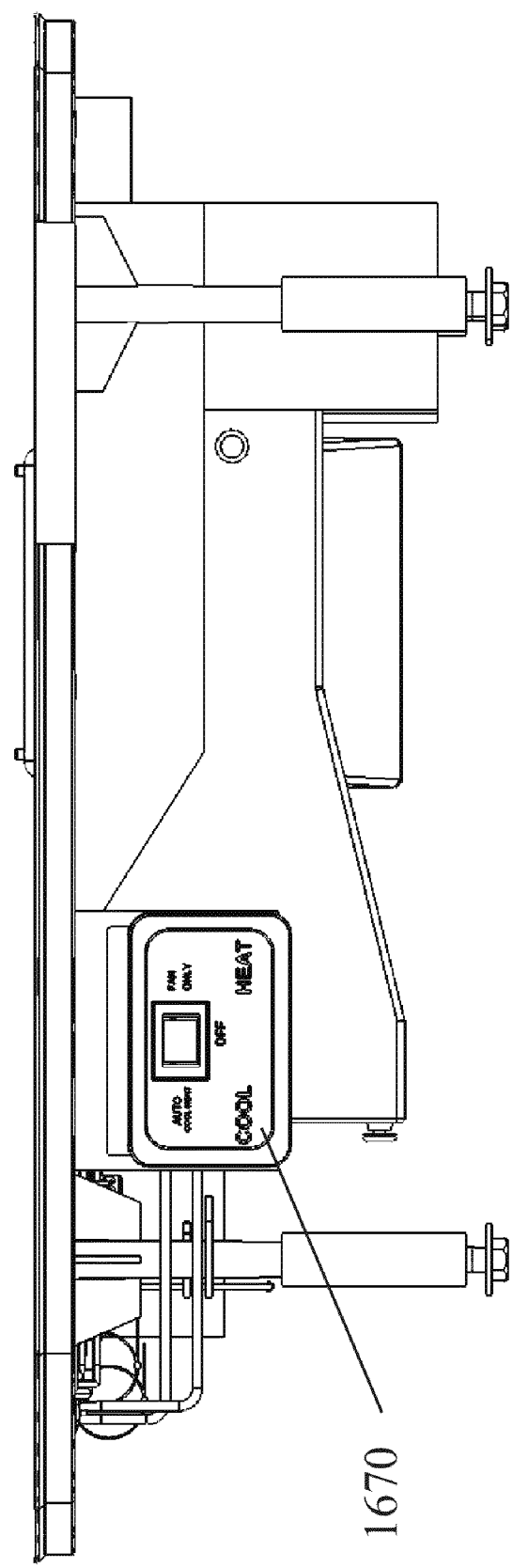
FIG. 13 is a side view of the heating and cooling system of one embodiment of the invention.

FIG. 13 is a side view of the heating and cooling system of one embodiment of the invention and shows one embodiment of the controller 1670 that allows a user to control or set the heating and cooling system.

Figure 14:
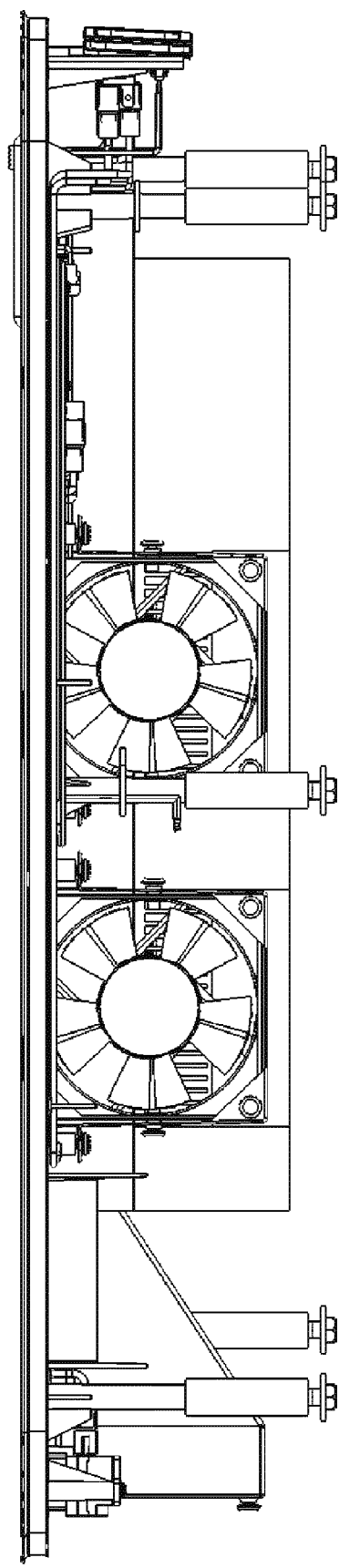
FIG. 14 is a side view of the heating and cooling system of one embodiment of the invention.
Figure 15:
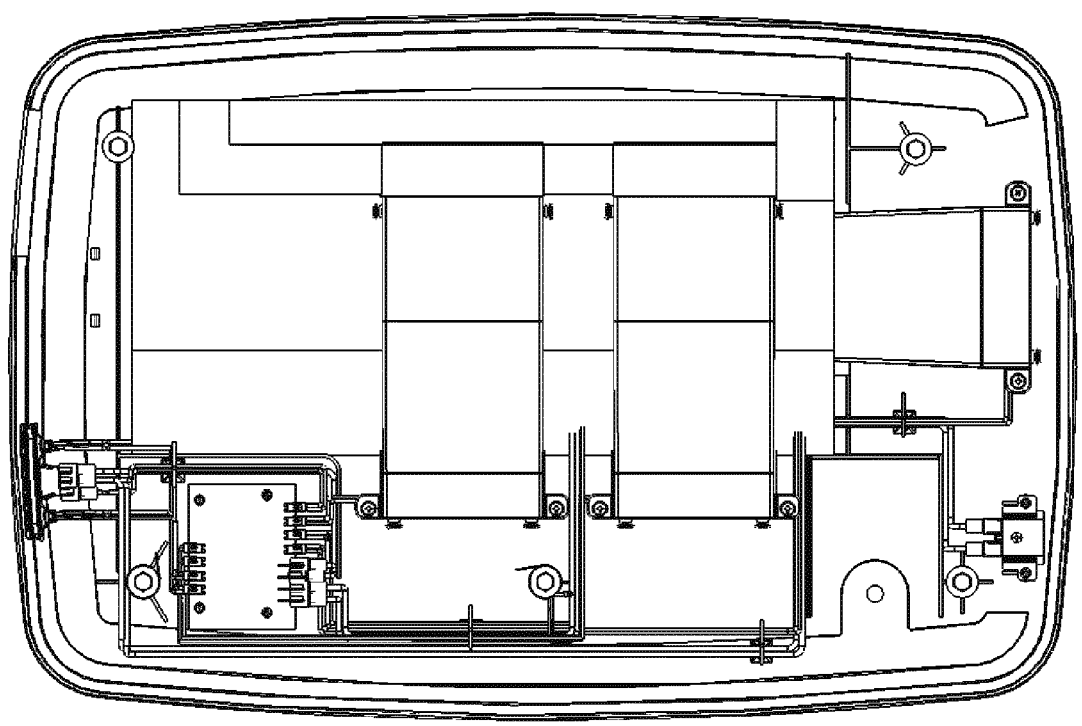
FIG. 15 is a bottom view of the heating and cooling system of one embodiment of the invention.
Figure 16:
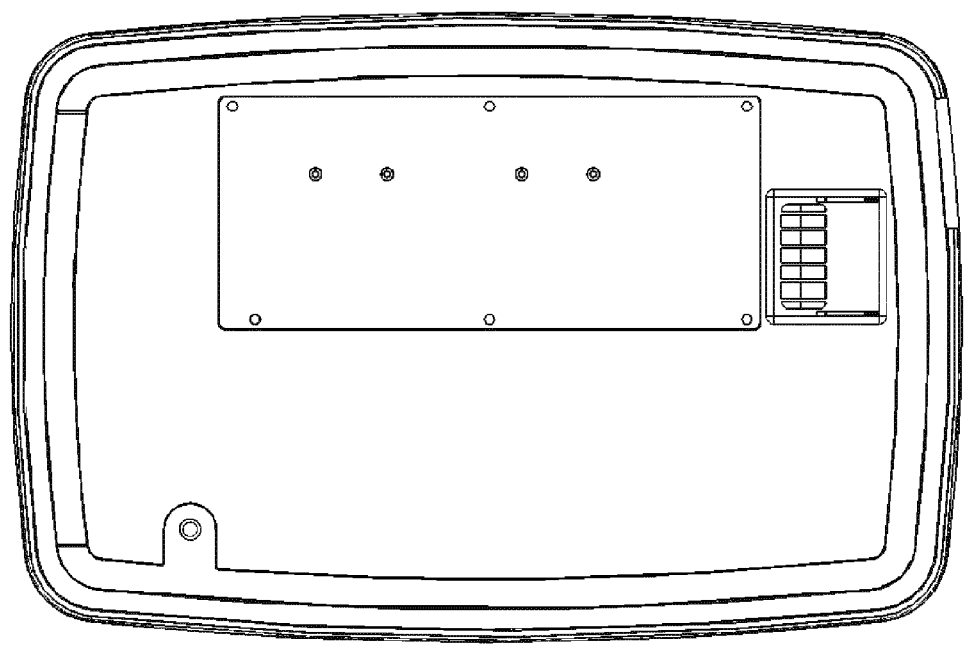
FIG. 16 is a top view of the heating and cooling system of one embodiment of the invention.
Figure 17:
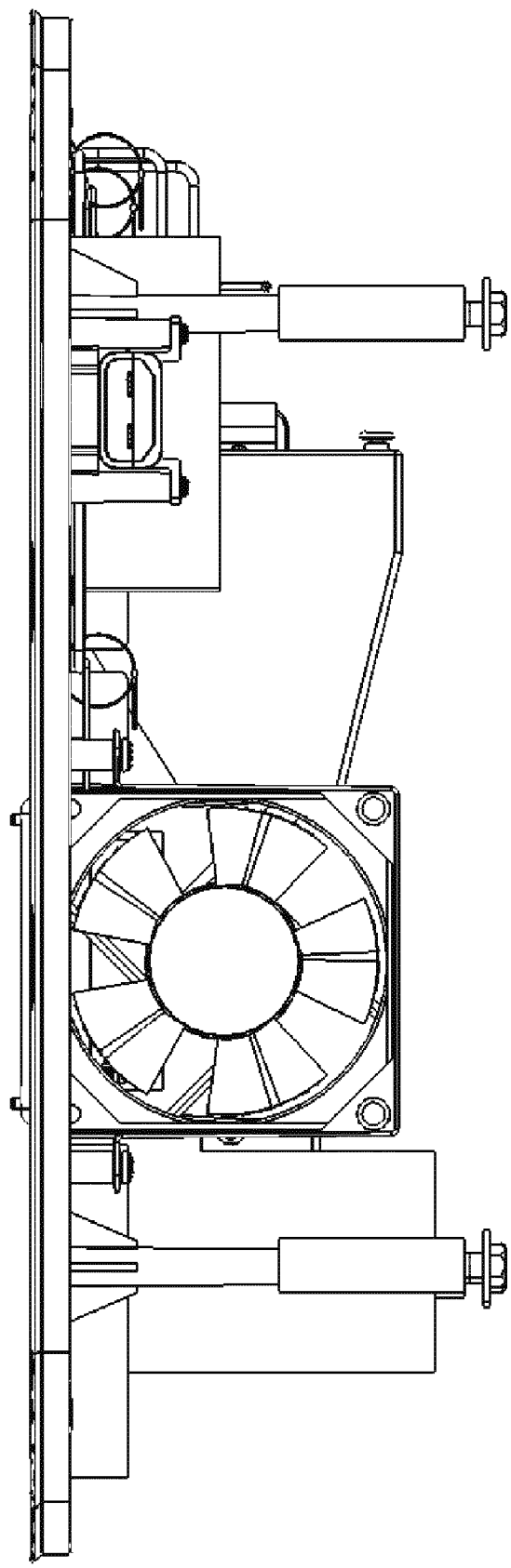
FIG. 17 is a side view of the heating and cooling system of one embodiment of the invention.

FIG. 14 is a side view of the heating and cooling system of one embodiment of the invention. FIG. 15 is a bottom view of the heating and cooling system of one embodiment of the invention. FIG. 16 is a top view of the heating and cooling system of one embodiment of the invention. FIG. 17 is a side view of the heating and cooling system of one embodiment of the invention.

Figure 18:
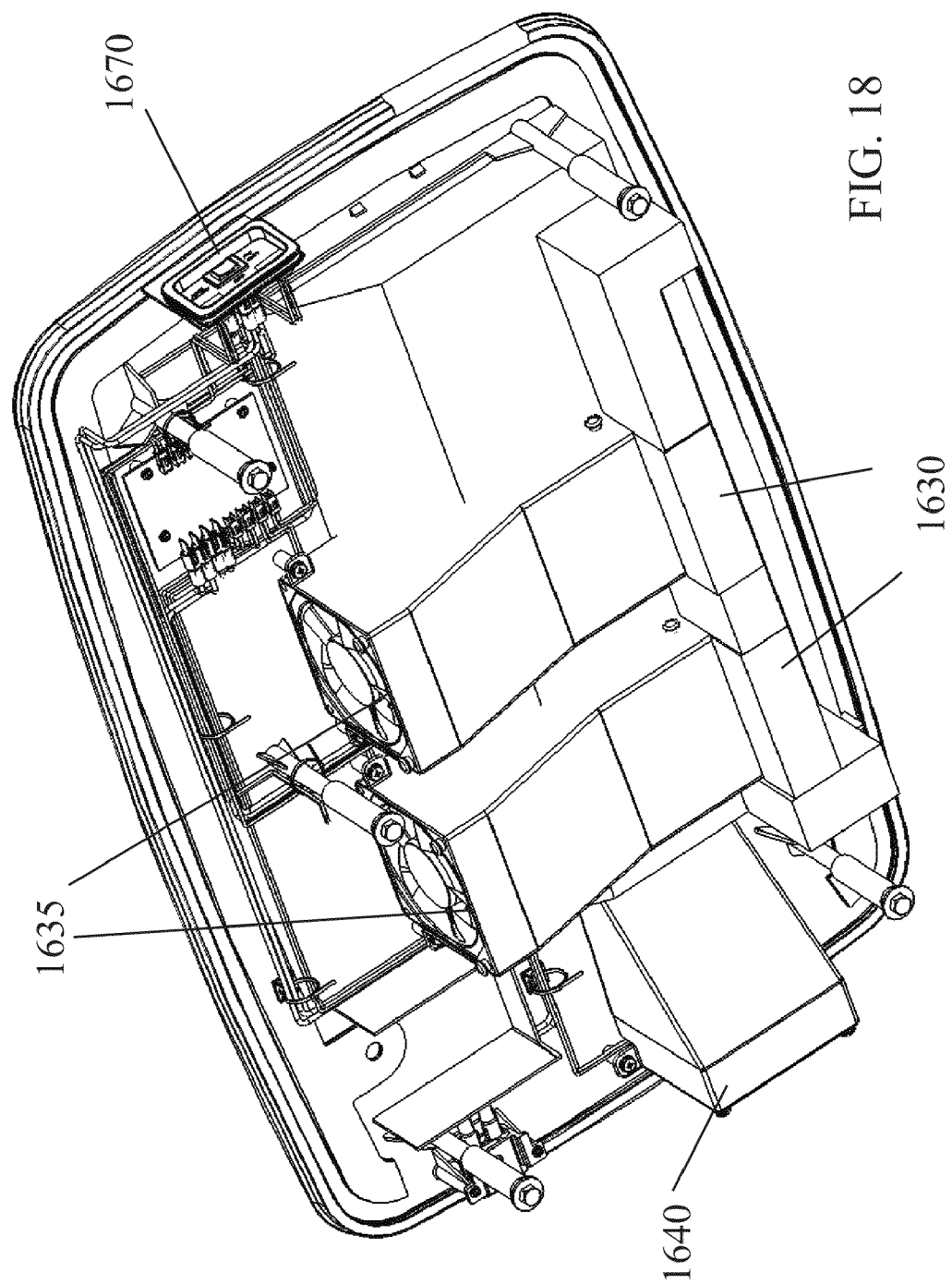
FIG. 18 is a bottom perspective view of the heating and cooling system of one embodiment of the invention.

FIG. 18 is a bottom perspective view of the heating and cooling system of one embodiment of the invention. FIG. 18 shows that the heating and cooling system preferably includes second heat sinks 1630, second fans 1635, fan 1640, and controller 1670.

Figure 19:
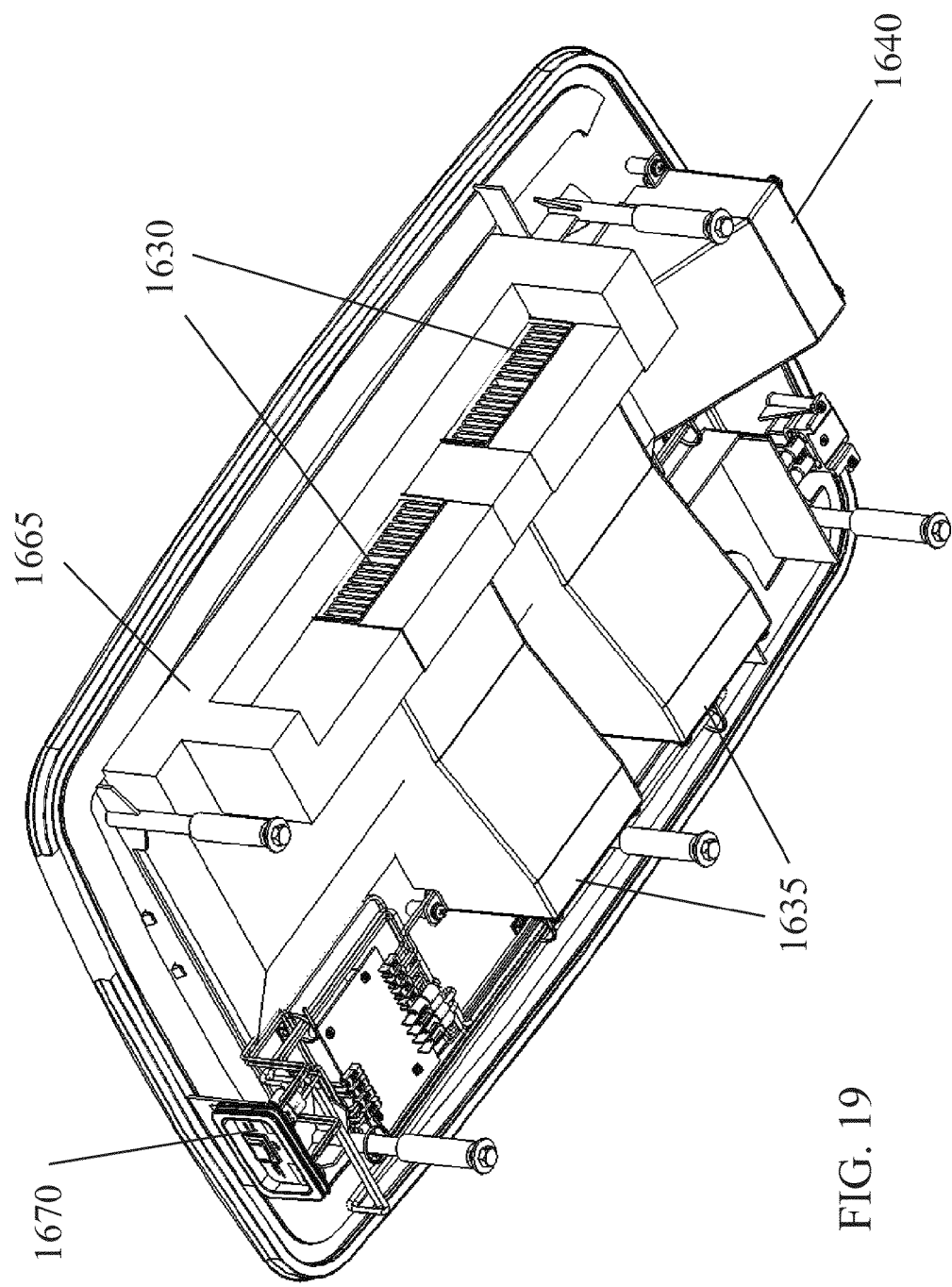
FIG. 19 is a bottom perspective view of the heating and cooling system of one embodiment of the invention.

FIG. 19 is a bottom perspective view of the heating and cooling system of one embodiment of the invention. FIG. 19 shows that the heating and cooling system preferably includes second heat sinks 1630, second fans 1635, fan 1640, and controller 1670.

Figure 20:
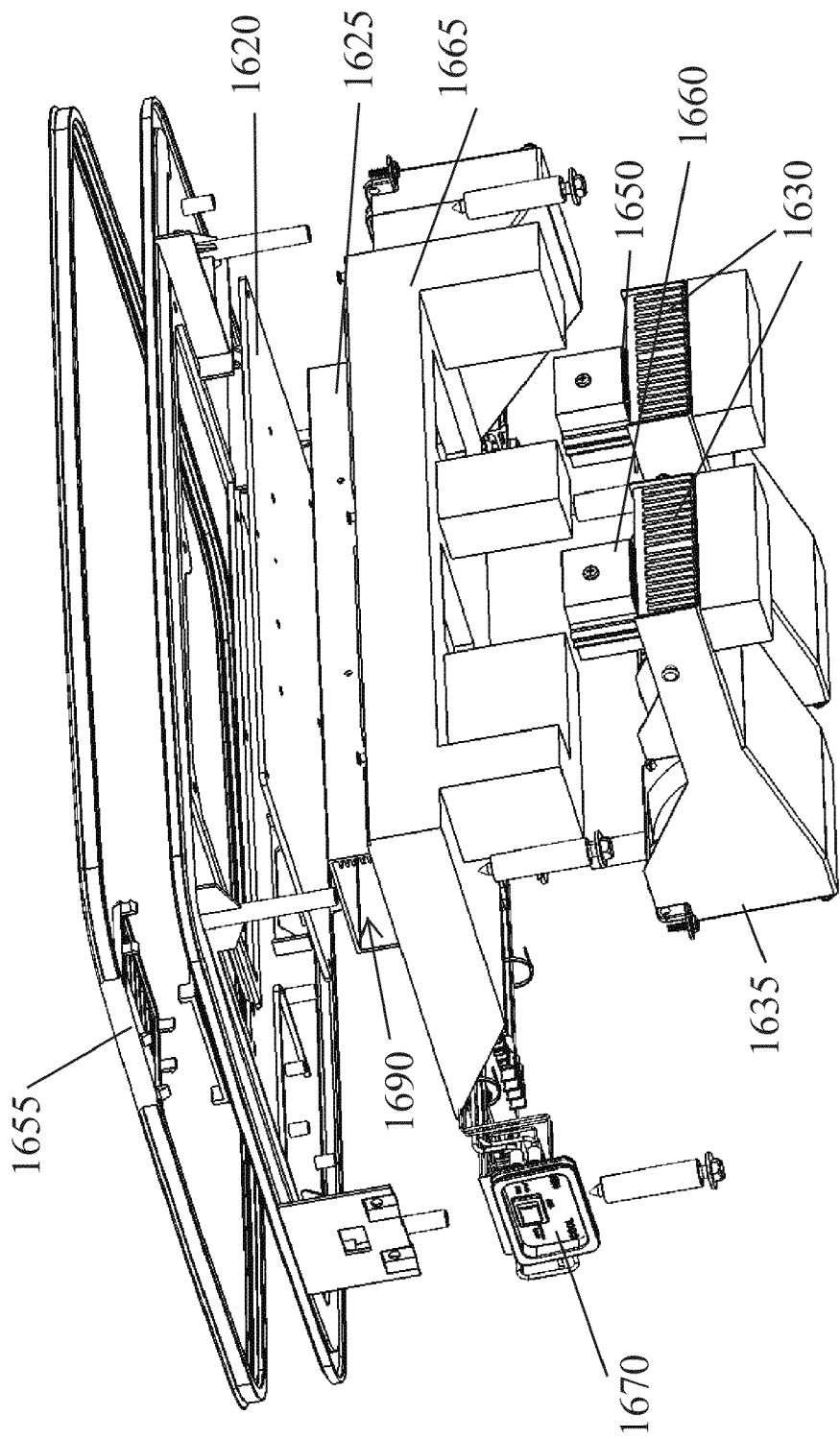
FIG. 20 is a side exploded detailed view of a heating and cooling system of one embodiment of the invention.

FIG. 20 is a side exploded view of a heating and cooling system of one embodiment of the invention. FIG. 20 shows that the heating and cooling system preferably includes conduction surface 1620, heat sink 1625, second heat sinks 1630, second fans 1635, fan 1640, thermoelectric modules 1650, vent 1655, mounting blocks 1660, conduction block 1665, controller 1670, and air plenum 1690. The thermoelectric modules 1650 are attached to a first heat sink 1625 and second heat sinks 1630. FIG. 20 also shows how the invention preferably includes a conduction block that surrounds the mounting blocks (and may even be fixedly connected to them). In this manner, the thermoelectric modules are able to efficiently conduct heat to the heat sink 1625 and conduction surface 1620. FIG. 20 shows how the first heat sink 1625 simultaneously heats or cools the conduction surface (through mounting blocks 1660 and the conduction block 1665) and the air within air plenum 1690. Fans 1635 draw the air within air plenum 1690 over heat sink 1625 (heating or cooling the air), out vent 1655, and into the pet enclosure in which the heating and cooling system preferably resides. In this manner a pet within the pet enclosure is heated or cooled by both conduction and convection means. The heating and cooling system also preferably includes second heat sinks 1630 and second fans 1635, which dissipate and/or exhaust the hot air if cooling or cold air if heating.

Figure 21:
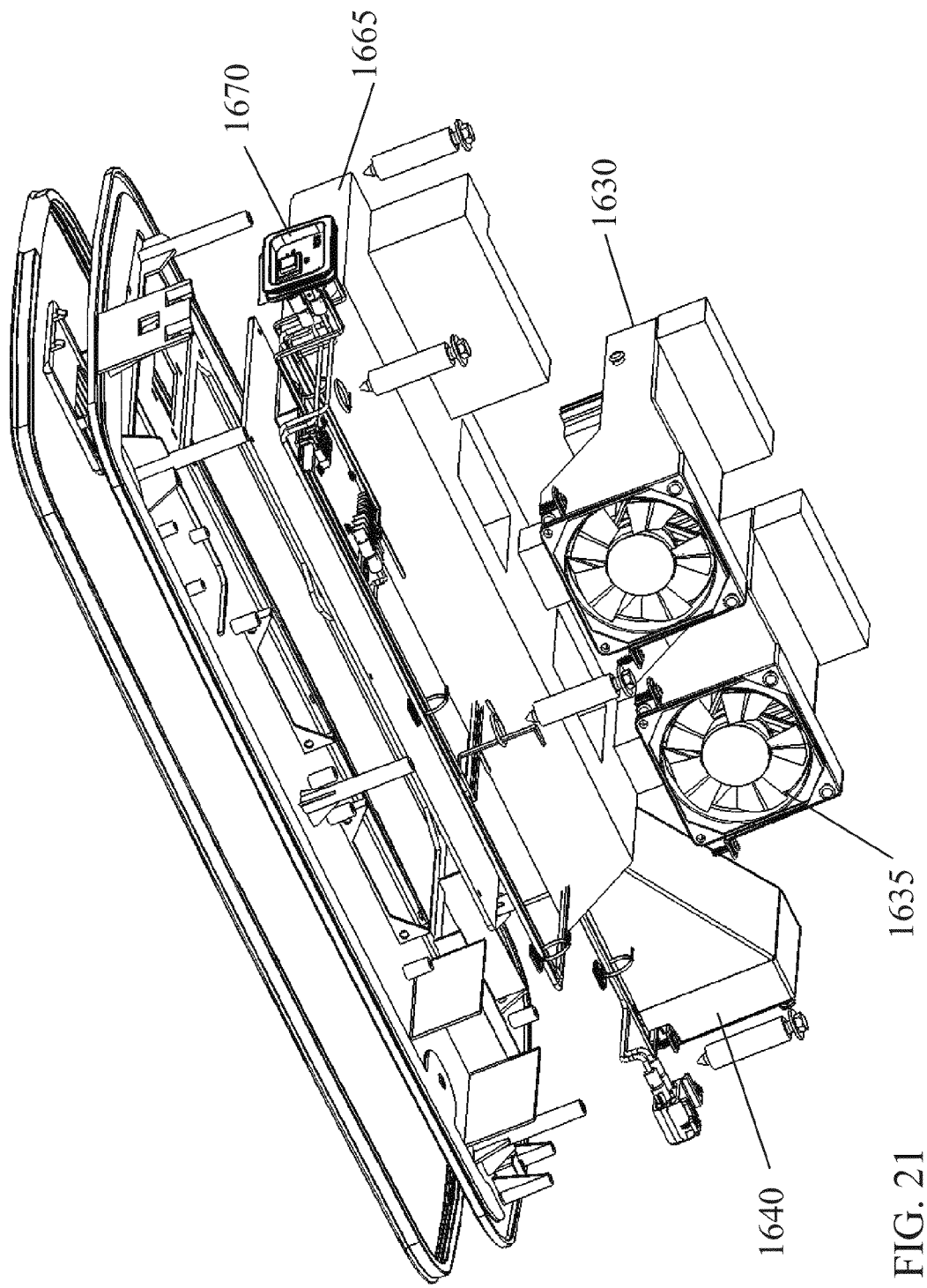
FIG. 21 is a bottom exploded detailed view of a heating and cooling system of one embodiment of the invention.

FIG. 21 is a bottom exploded detailed view of a heating and cooling system of one embodiment of the invention. FIG. 21 shows that the heating and cooling system preferably includes second heat sinks 1630, second fans 1635, fan 1640, conduction block 1665, and controller 1670.

Figure 22:
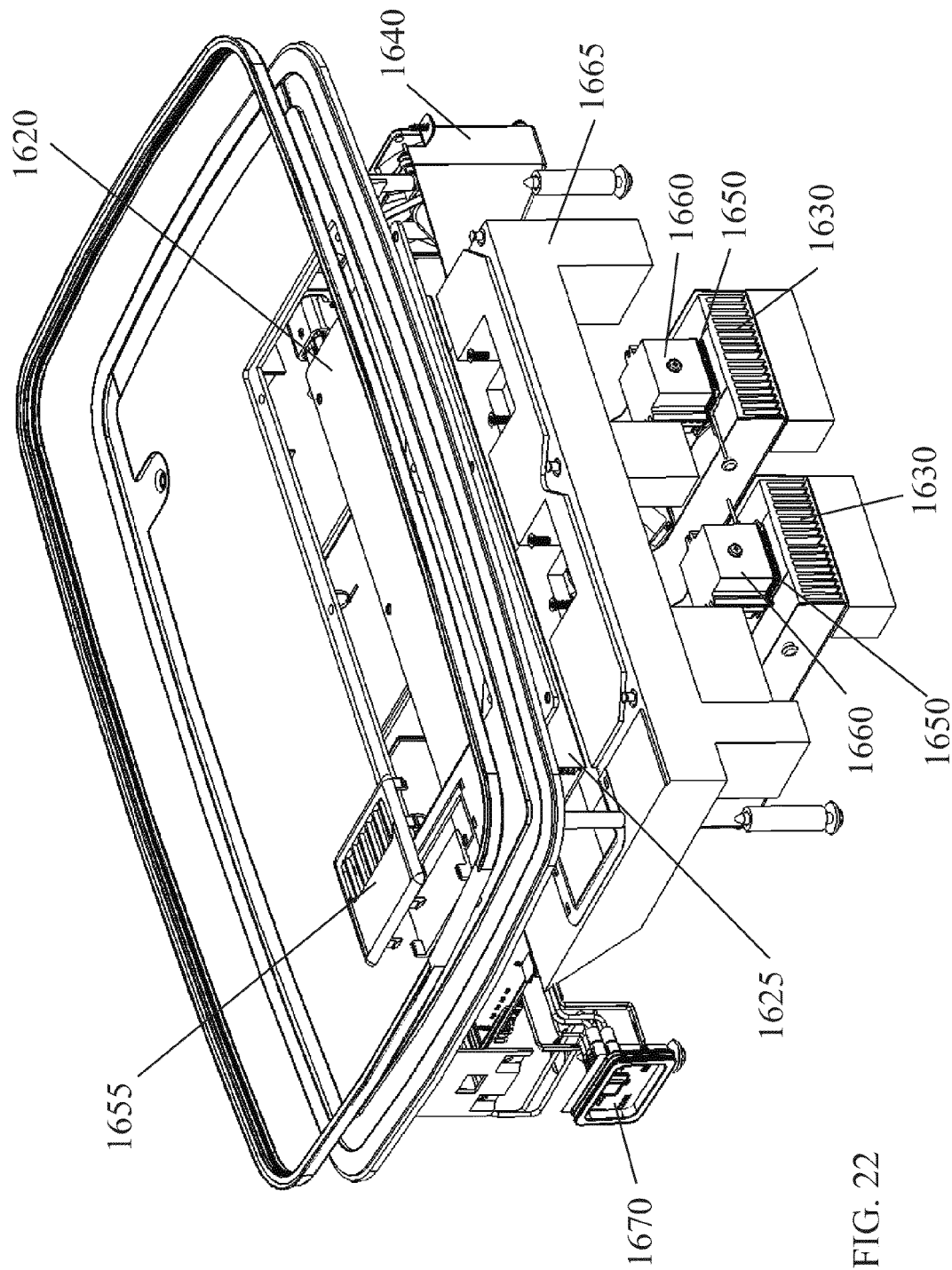
FIG. 22 is a top exploded detailed view of a heating and cooling system of one embodiment of the invention.

FIG. 22 is a top exploded detailed view of a heating and cooling system of one embodiment of the invention. FIG. 22 shows that the heating and cooling system preferably includes conduction surface 1620, heat sink 1625, second heat sinks 1630, fan 1640, thermoelectric modules 1650, vent 1655, mounting blocks 1660, conduction block 1665, and controller 1670. FIG. 22 shows an embodiment that uses two Peltier thermoelectric modules 1650, however, any number of modules may be used. The thermoelectric modules 1650 are attached to a first heat sink 1625. As shown in FIG. 22, the conduction surface 1620 is preferably fixedly connected to the first heat sink 1625. Heat sink 1625 is preferably hollow to create air plenum 1690. In this manner the first heat sink simultaneously heats or cools the conduction surface 1620 (through mounting blocks 1660) and the air within air plenum 1690. Fan 1640 draws the air within air plenum 1690 over heat sink 1625 and out vent 1655, and into the pet enclosure in which the heating and cooling system preferably resides. In this manner a pet within the pet enclosure is heated or cooled by both conduction and convection. The heating and cooling system may also include second heat sinks 1630 and second fans 1635, which dissipate and/or exhaust the hot or cold air.

The foregoing descriptions of several embodiments of the invention have been presented for the purposes of illustration and description. While multiple embodiments are disclosed, still other embodiments of the present invention will become apparent to those skilled in the art from the above detailed description, which shows and describes illustrative embodiments of the invention. As will be realized, the invention is capable of modifications in various obvious aspects, all without departing from the spirit and scope of the present invention. Accordingly, the detailed description is to be regarded as illustrative in nature and not restrictive. Also, although not explicitly recited, one or more embodiments of the invention may be practiced in combination or conjunction with one another. Furthermore, the reference or non-reference to a particular embodiment of the invention shall not be interpreted to limit the scope the invention. It is intended that the scope of the invention not be limited by this detailed description, but by the claims and the equivalents to the claims that are appended hereto.

What is claimed is:

1. A pet carrier, comprising:
   a portable pet carrier;
   one or more thermoelectric modules;
   a thermostatic control system;
   a power source; one or more conduction surfaces;
   one or more fans;
   one or more heat sinks; and
   an air plenum;
   wherein said portable pet carrier is comprised of a ceiling, a floor, a plurality of walls, and one or more openings that allow the ingress and egress of pets to and from said portable pet carrier;
   wherein said power source provides a current to said one or more thermoelectric modules;
   wherein said one or more thermoelectric modules are configured to alternatively heat or cool said portable pet carrier;
   wherein said thermostatic control system is configured to control an operation of said one or more thermoelectric modules by commanding said one or more thermoelectric modules to alternatively generate heating or cooling;
   wherein said control system distributes said current based on a calculated difference between a desired temperature and a measured temperature;
   wherein said measured temperature is the temperature that a pet within said portable pet carrier experiences;
   wherein said measured temperature is adjusted towards said desired temperature through conduction and convection;
   wherein said one or more conduction surfaces are part of said floor of said portable pet carrier; and
   wherein said one or more conduction surfaces allow heat conduction to and from a body of said pet.

2. The pet carrier of claim 1, wherein said one or more heat sinks are fixedly connected to said one or more thermoelectric modules and located such that a portion of said one or more heat sinks is within said air plenum; wherein said air plenum is configured to allow air to pass over at least a portion of said one or more heat sinks that is within said air plenum and into said portable pet carrier; wherein said one or more fans draw air through said air plenum and into said portable pet carrier such that said portable pet carrier is heated or cooled simultaneously by said air passing through said air plenum and said one or more conduction surfaces.

3. The pet carrier of claim 2, wherein said one or more heat sinks further serve as a mounting device to connect said one or more conduction surfaces to said one or more thermoelectric modules and further serve to conduct heat to and from said one or more conduction surfaces.

4. The pet carrier of claim 3, further comprising: one or more second heat sinks.

5. The pet carrier of claim 4, wherein said one or more second heat sinks are connected to the opposite side of said one or more thermoelectric modules that said one or more heat sinks is mounted.

6. The pet carrier of claim 5, further comprising: one or more second fans; wherein said one or more second fans are configured to draw air over said second heat sink and out of said portable pet carrier.

7. The pet carrier of claim 6, wherein said one or more heat sinks is further comprised of: a mounting portion; wherein said mounting portion of said one or more heat sinks is mounted onto said one or more thermoelectric modules, is fixedly connected to said portion of said one or more heat sinks within said air plenum, and is fixedly connected to said one or more conduction surfaces.

8. The pet carrier of claim 7, further comprising: one or more vents;
   wherein said one or more vents direct said air passing through said air plenum into said portable pet carrier; wherein said one more vents include a directional control to vary the direction of said air passing through said air plenum into said portable pet carrier; wherein said one or more vents are closable.

9. The pet carrier of claim 8, further comprising: a remote monitoring system; a remote monitoring device; wherein said remote monitoring system sends and receives information related to a condition of said pet or an interior of said portable pet carrier.

10. A pet living space, comprising:
    a pet living space;
    one or more thermoelectric modules;
    a power source;
    one or more conduction surfaces;
    one or more fans;
    a thermostatic control system;
    one or more heat sinks; and
    an air plenum;
    wherein said pet living space is comprised of a ceiling, a floor, a plurality of walls, and one or more openings that allow the ingress and egress of pets to and from said pet living space;
    wherein said power source provides a current to said one or more thermoelectric modules;
    wherein said one or more thermoelectric modules are configured to alternatively heat or cool said pet living space;
    wherein said thermostatic control system is configured to control an operation of said one or more thermoelectric modules by commanding said one or more thermoelectric modules to alternatively generate heating or cooling;
    wherein said control system distributes said current based on a calculated difference between a desired temperature and a measured temperature;
    wherein said measured temperature is the temperature that a pet within said pet living space experiences;

wherein said measured temperature is adjusted towards said desired temperature through conduction and convection;

wherein said one or more conduction surfaces are part of said floor of said pet living space;

wherein said one or more conduction surfaces allow heat conduction to and from a body of said pet;

wherein said one or more heat sinks are fixedly connected to said one or more thermoelectric modules and located such that a portion of said one or more heat sinks is within said air plenum; wherein said air plenum is configured to allow air to pass over at least a portion of said one or more heat sinks that is within said air plenum and into said pet living space;

wherein said one or more fans draw air through said air plenum and into said pet living space such that said pet living space is heated or cooled simultaneously by said air passing through said air plenum and said one or more conduction surfaces;

wherein said one or more heat sinks further serve as a mounting device to connect said one or more conduction surfaces to said one or more thermoelectric modules and further serve to conduct heat to and from said one or more conduction surfaces.

11. The pet living space of claim 10, further comprising: one or more second heat sinks; one or more second fans; one or more vents; wherein said one or more second heat sinks are connected to the opposite side of said one or more thermoelectric modules that said one or more heat sinks is mounted; wherein said one or more second fans are configured to draw air over said second heat sink and out of said pet living space; wherein said one or more heat sinks is further comprised of a mounting portion; wherein a mounting portion of said one or more heat sinks is mounted onto said one or more thermoelectric modules, is fixedly connected to said portion of said one or more heat sinks within said air plenum, and is fixedly connected to said one or more conduction surfaces; wherein said one or more vents direct said air passing through said air plenum into said pet living space; wherein said one more vents include a directional control to vary the direction of said air passing through said air plenum into said pet living space.

12. The pet living space of claim 11, further comprising: a remote monitoring system; a remote monitoring device; wherein said remote monitoring system sends and receives information related to a condition of said pet or an interior of said pet living space.

13. The pet living space of claim 12, wherein said pet living space is selected from the group consisting of: pet kennels, pet carriers, doghouses, and pet enclosures.

\* \* \* \* \*